US009696418B2

(12) United States Patent
Holder

(10) Patent No.: US 9,696,418 B2
(45) Date of Patent: Jul. 4, 2017

(54) SYSTEMS, METHODS AND COMPUTER-READABLE MEDIA FOR IMPROVING PLATFORM GUIDANCE OR NAVIGATION USING UNIQUELY CODED SIGNALS

(71) Applicant: Propagation Research Associates, Inc., Marietta, GA (US)

(72) Inventor: Ernest Jefferson Holder, Canton, GA (US)

(73) Assignee: Propagation Research Associates, Inc., Marietta, GA (US)

( * ) Notice: Subject to any disclaimer, the term of this patent is extended or adjusted under 35 U.S.C. 154(b) by 0 days.

(21) Appl. No.: 15/140,381

(22) Filed: Apr. 27, 2016

(65) Prior Publication Data

US 2016/0327370 A1    Nov. 10, 2016

Related U.S. Application Data

(60) Provisional application No. 62/156,880, filed on May 4, 2015.

(51) Int. Cl.
| | |
|---|---|
| *F41F 3/06* | (2006.01) |
| *F41F 3/08* | (2006.01) |
| *G01S 1/08* | (2006.01) |
| *G01S 5/00* | (2006.01) |
| *H03D 7/00* | (2006.01) |
| *B64D 1/06* | (2006.01) |
| *B64D 7/08* | (2006.01) |
| *G01S 13/42* | (2006.01) |
| *G01S 13/88* | (2006.01) |

(Continued)

(52) U.S. Cl.
CPC ............ *G01S 13/42* (2013.01); *F41G 7/2266* (2013.01); *F41G 7/2286* (2013.01); *F41G 7/303* (2013.01); *G01S 5/14* (2013.01); *G01S 13/003* (2013.01); *G01S 13/66* (2013.01); *G01S 13/883* (2013.01)

(58) Field of Classification Search
CPC combination set(s) only.
See application file for complete search history.

(56) References Cited

U.S. PATENT DOCUMENTS

| 5,252,980 A | 10/1993 | Gray et al. |
| 5,949,364 A | 9/1999 | Katzberg et al. |

(Continued)

*Primary Examiner* — Yonel Beaulieu
(74) *Attorney, Agent, or Firm* — Robert A. Blaha; Smith Tempel Blaha LLC

(57) ABSTRACT

A spatially-distributed architecture (SDA) of antennas transmits a set of uniquely coded signals. A first receiver having a known position in a coordinate system defined by the SDA receives reflected versions of the uniquely coded signals. A first processor receives the reflected versions of the uniquely coded signals and identifies a position of a non-cooperative object in the coordinate system. A platform having a second receiver receives non-reflected versions of the uniquely coded signals. The platform determines a position of the platform in the coordinate system. In an example, the platform uses a self-determined position and a position of the non-cooperative object communicated from the SDA to navigate or guide the platform relative to the non-cooperative object. In another example, the platform uses a self-determined position and information from an alternative signal source in a second coordinate system to guide the platform after a coordinate conversion.

52 Claims, 12 Drawing Sheets

(51) Int. Cl.
   *G01S 13/00*     (2006.01)
   *G01S 13/66*     (2006.01)
   *F41G 7/22*      (2006.01)
   *F41G 7/30*      (2006.01)
   *G01S 5/14*      (2006.01)

(56) References Cited

U.S. PATENT DOCUMENTS

| | | |
|---|---|---|
| 6,232,922 B1 | 5/2001 | McIntosh |
| 6,710,743 B2 | 3/2004 | Benner et al. |
| 6,744,408 B1 | 6/2004 | Stockmaster |
| 7,379,515 B2 * | 5/2008 | Johnson .............. H03D 7/00 375/347 |
| 7,554,508 B2 * | 6/2009 | Johnson .............. H03D 7/00 343/893 |
| 8,120,526 B2 * | 2/2012 | Holder ............... G01S 13/003 342/139 |
| 8,363,768 B2 | 1/2013 | Patino-Studencka et al. |
| 8,610,041 B1 | 12/2013 | Boardman |
| 8,854,252 B2 | 10/2014 | Holder |
| 8,874,477 B2 * | 10/2014 | Hoffberg ............ G06Q 10/0631 705/37 |

* cited by examiner

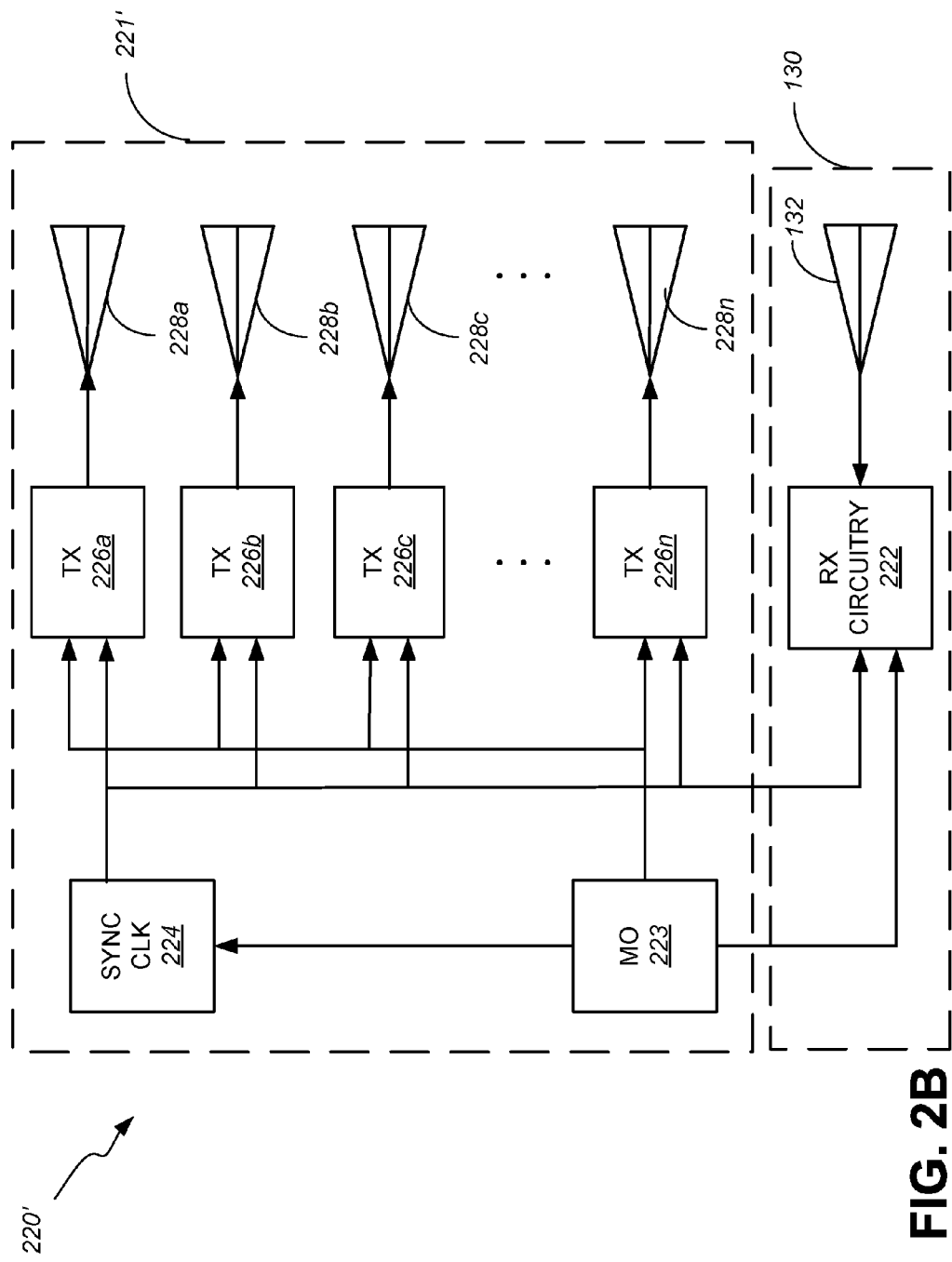

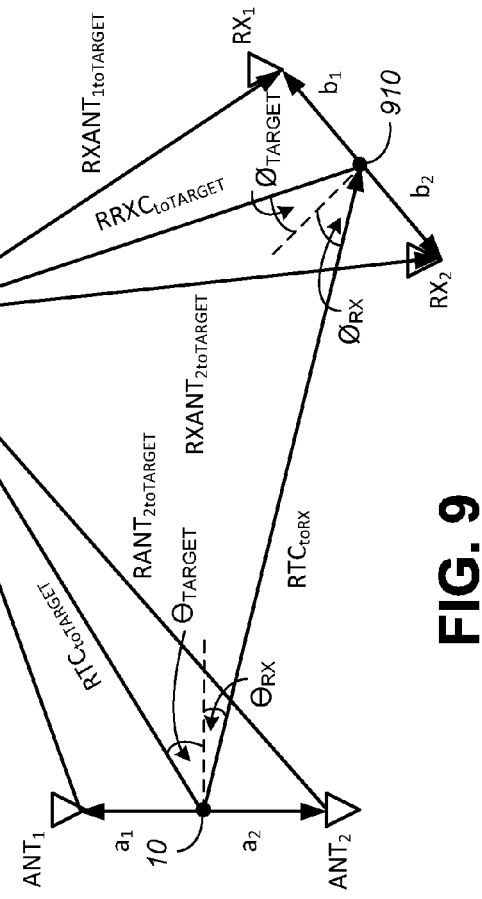
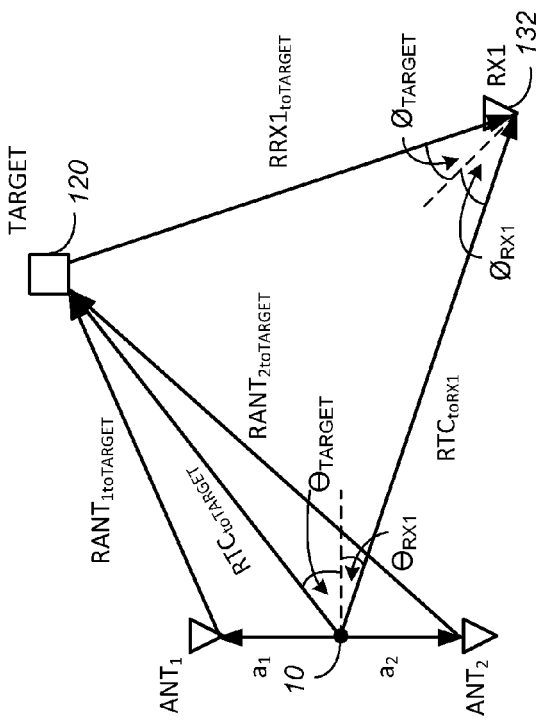
FIG. 9
FIG. 8

SYSTEMS, METHODS AND COMPUTER-READABLE MEDIA FOR IMPROVING PLATFORM GUIDANCE OR NAVIGATION USING UNIQUELY CODED SIGNALS

CROSS-REFERENCE TO RELATED APPLICATIONS

This application is a U.S. Non-provisional patent application which claims the benefit of the filing date of a provisional patent application assigned application Ser. No. 62/156,880, filed on May 4, 2015, entitled "A Method for Improving Commanded Platform Guidance Using Coded Signals," the entire contents of which is incorporated herein by reference in its entirety.

TECHNICAL FIELD

The invention relates to systems and methods for determining the position and relative motion (if any) of a non-cooperative object and the position and relative motion of a cooperative platform while guiding or navigating the cooperative platform relative to the non-cooperative object.

BACKGROUND

Command guidance fire control systems are used to guide a missile into a target. Command guidance fire control systems track the position and motion of the missile and of the target while controlling the flight path of the missile to cause it to intercept the target. The missile is often referred to as an interceptor or interceptor platform. The target is a "non-cooperative object," and will be referred to herein interchangeably as a target or as a non-cooperative object. The command guidance fire control system includes one or more radar systems located at a fire control sensor station of the command guidance fire control system. The fire control sensor station may be fixed (e.g., when located on or in a structure or structures) or unfixed (e.g., when located on or in a non-moving vehicle) or the fire control sensor station may be located on a moving platform, such as a ship, a tank, an airplane, etc. The command guidance fire control system also includes a receiver located on the interceptor platform and a transmitter located at the fire control sensor station.

The radar system transmits radar signals from the fire control sensor station. The radar system includes a radar sensor that detects radar signals reflected off of the non-cooperative object and off of the interceptor platform. A processor of the fire control sensor station processes the detected radar signals and determines the position and motion of the target and of the interceptor platform. The processor then computes a guidance solution. The transmitter located at the fire-control station transmits the guidance solution to the receiver located on the interceptor platform. The guidance solution is processed by a processor on the interceptor platform that causes the flight path of the interceptor platform to be adjusted, if necessary, to maintain a flight path that will intercept the target, or non-cooperative object.

One of the problems inherent in a conventional command guidance fire control system attempting to intercept a target is that the computation of the guidance solution at the fire-control sensor station and the communication of the guidance solution to the interceptor platform introduce excessive time delays between the time of determining target position and motion and the time of guidance solution command execution on the interceptor platform. These delays are attributed to: 1) the time that is required for the fire control sensor station to detect and determine the separate position and motion of both the target and the interceptor platform: 2) the time that is required for the fire control sensor station to compute the guidance solution in a coordinate frame convenient for the interceptor platform to execute guidance solution commands; 3) the time that is required for the guidance solution to be communicated from the fire control sensor station to the interceptor platform; and 4) the time that is required for the interceptor platform to process the received communication.

For the fire control sensor station to determine accurate guidance commands in a coordinate frame convenient for or suitable for use by the interceptor platform, the fire control sensor station must have knowledge about the orientation of the interceptor platform, which requires time and resources that can degrade the efficiency of the fire-control sensor station. Also, the requirement for the fire control sensor station to track the interceptor platform can introduce errors in the position and motion of the interceptor platform due to a lack of a stable reflection from the interceptor platform. These errors, in turn, introduce two-way path signal propagation spreading losses that impose signal-to-noise requirements on the command guidance fire control system that may be difficult to meet.

To address the time delay problems associated with conventional command guidance fire control systems, methods have been used to enhance guidance solution processing at the fire control sensor station processor and to improve the communication links between the fire control sensor station and the interceptor platform. One conventional method for aligning the coordinate frame of the interceptor platform with the coordinate frame of the fire control station requires that the fire control sensor station track the motion of the interceptor platform through one or more maneuvers. These jink maneuvers include one or more changes of direction to allow the fire control sensor station's estimate of the interceptor platform velocity vector to be aligned with an onboard inertial sensor estimate of the interceptor platform velocity, but generally require either communicating the interceptor platform velocity from the interceptor platform to the fire control sensor or communicating the fire control sensor station's estimate of interceptor platform velocity to the interceptor platform and performing the alignment computation in the interceptor platform processor. In either case, the coordinate alignment adds complexity and processing requirements to the command guidance fire control system.

Other solutions for addressing these issues have introduced active and semi-active seekers onboard the interceptor platform to compute the position and motion of the non-cooperative object on the interceptor platform. While these systems do mitigate timing delays and eliminate the need for jink maneuvers, they introduce another level of complexity that can impact overall system cost. In particular, these seeker solutions require alignment and calibration of the onboard sensor hardware with the on-board inertial navigation hardware that can add to complexity and cost.

In general, the existing solutions incur significant time delays due to increases in processing overhead and information sharing requirements between the fire control sensor station and the interceptor platform and/or increase onboard interceptor platform hardware complexity and cost.

U.S. Pat. No. 8,120,526 (hereinafter "the '526 patent"), which is assigned to the applicant of the present application and which discloses inventions that were invented by the inventor of the present application, discloses a guidance system in which the interceptor platform is capable of self-determining its own position and motion and the position and motion of the target, or non-cooperative object, using coded signals. While the '526 patent includes significant improvements over the above-described conventional systems, complexity and costs due to processing overhead requirements remain.

SUMMARY

Improved systems for locating, guiding or navigating platforms are disclosed. In some embodiments, a common coordinate system consisting of at least two orthogonal axes is used to avoid the above-described complexities in conventional guidance and fire control systems. Some applications define and apply a two-axis coordinate system to describe position, motion and orientation, while some other applications will call for a common or first coordinate system consisting of a three-axis coordinate system. Such a three-axis coordinate system will consist of three orthogonal (or substantially orthogonal) axes.

The improved systems include a spatially-distributed architecture (SDA) of antenna arrays that transmit a set of uniquely coded signals. A first receiver having a known position in a coordinate system defined by the SDA of antenna arrays receives reflected versions of the uniquely coded signals. The first receiver may be removed from or located near or even at a phase center of the SDA of antenna arrays. One or more characteristics of the uniquely coded signals present in the reflected versions received by the first receiver are forwarded to a first processor. The first processor receives electrical signals representative of the reflected versions of the uniquely coded signals and identifies one or more of a position, motion (if any) and orientation of a non-cooperative object in the coordinate system. A platform, separate from both the SDA and first receiver, includes a second receiver that receives non-reflected versions of the uniquely coded signals. A platform processor determines one or more of a platform position, motion (if any) and orientation in the coordinate system based on one or more characteristics of the non-reflected versions of the uniquely coded signals.

Another example embodiment includes a method for locating at least one non-cooperative object and communicating the location of the at least one non-cooperative object to at least one platform in a first coordinate system determined by a SDA of N antenna arrays, the method includes the steps of: transmitting, with a SDA of N antenna arrays, a set of uniquely identifiable signals, where N is an integer greater than or equal to two; receiving, with a receiver having a known position relative to the SDA of N antenna arrays, reflected versions of the uniquely identifiable signals transmitted from the SDA of N antenna arrays and reflected from the non-cooperative object; determining, with a processor in communication with the receiver, a location of the non-cooperative object with respect to the SDA of N antenna arrays, the determining based on one or more characteristics of the reflected versions of the uniquely identified signals; and communicating, from the processor in communication with the receiver, the location of the of the non-cooperative object to the at least one platform.

Still another example embodiment includes a method for self-determining one or more of a position, a motion, and an orientation in a coordinate system and generating a guidance solution, the method including receiving, with a first platform receiver connected to a platform, a set of uniquely identifiable signals transmitted from a SDA of N antenna arrays removed from the platform; determining, with a platform processor in communication with the first platform receiver, one or more of a position, a motion and an orientation of the platform in a first coordinate system defined by the SDA of N antenna arrays, wherein the platform processor identifies at least one of the position, motion and orientation of the platform using one or more characteristics of the uniquely identified signals received by the first platform receiver; receiving, one or more signals containing information about a non-cooperative object in the first coordinate system defined by the SDA of N antenna arrays; generating, with the platform processor, a guidance solution; and applying at least one control signal responsive to the guidance solution to direct the platform relative to the non-cooperative object.

Another example embodiment includes a non-transitory computer-readable medium having code stored thereon for execution by a processor in a sensor system, the computer-readable medium comprising a transmit module arranged to communicate a set of uniquely identifiable signals to a SDA of N antenna arrays, where N is a positive integer greater than or equal to two, the SDA of N antenna arrays defining a first coordinate system; a receive module coupled to a first receiver located at a known position in the first coordinate system where the first receiver, receives reflected versions of the set of uniquely identifiable signals transmitted from the SDA of N antenna arrays and reflected by the non-cooperative object, determines a location of the non-cooperative object in the first coordinate system based on a respective time and phase of reflected versions of the uniquely identified signals and an angular position and a range of the first receiver relative to an origin of the first coordinate system, and forwards an information signal containing the location of the non-cooperative object in the first coordinate system.

Another embodiment includes a non-transitory computer-readable medium having executable code stored thereon for execution by a processor, the computer-readable medium comprising: a locator module integrated in a movable platform and arranged to receive a first set of signals responsive to non-reflected versions of a set of uniquely identifiable signals transmitted from a SDA of N antenna arrays, where the locator module determines one or more of a platform position, motion and orientation from spatial relationships of the N antenna arrays and a respective time of arrival and phase of the first set of signals in the first coordinate system; and a second module arranged to receive one or more of the position, motion and orientation of the platform from the locator module and the position and motion of the non-cooperative object from a signal source remote from the movable platform, where the second module generates one or more control signals to direct the movable platform with respect to the non-cooperative object.

BRIEF DESCRIPTION OF THE DRAWINGS

Improved systems, methods and computer-readable media can be better understood with reference to the following drawings. Components and distances between components in the drawings are not necessarily to scale, emphasis instead being placed upon clearly illustrating the principles involved.

FIG. 2B is a schematic diagram illustrating an alternative embodiment of the SD architecture of FIG. 1.

FIG. 8 is a schematic diagram that illustrates spatial relationships in an example arrangement of a SDA, receiver and a non-cooperating object of FIG. 1 in two dimensions.

FIG. 9 is a schematic diagram that illustrates spatial relationships in an example arrangement of a SDA, a receiver with multiple antennas and a non-cooperative object of FIG. 1 in two dimensions.

DETAILED DESCRIPTION OF ILLUSTRATED EMBODIMENTS

Figure 1:
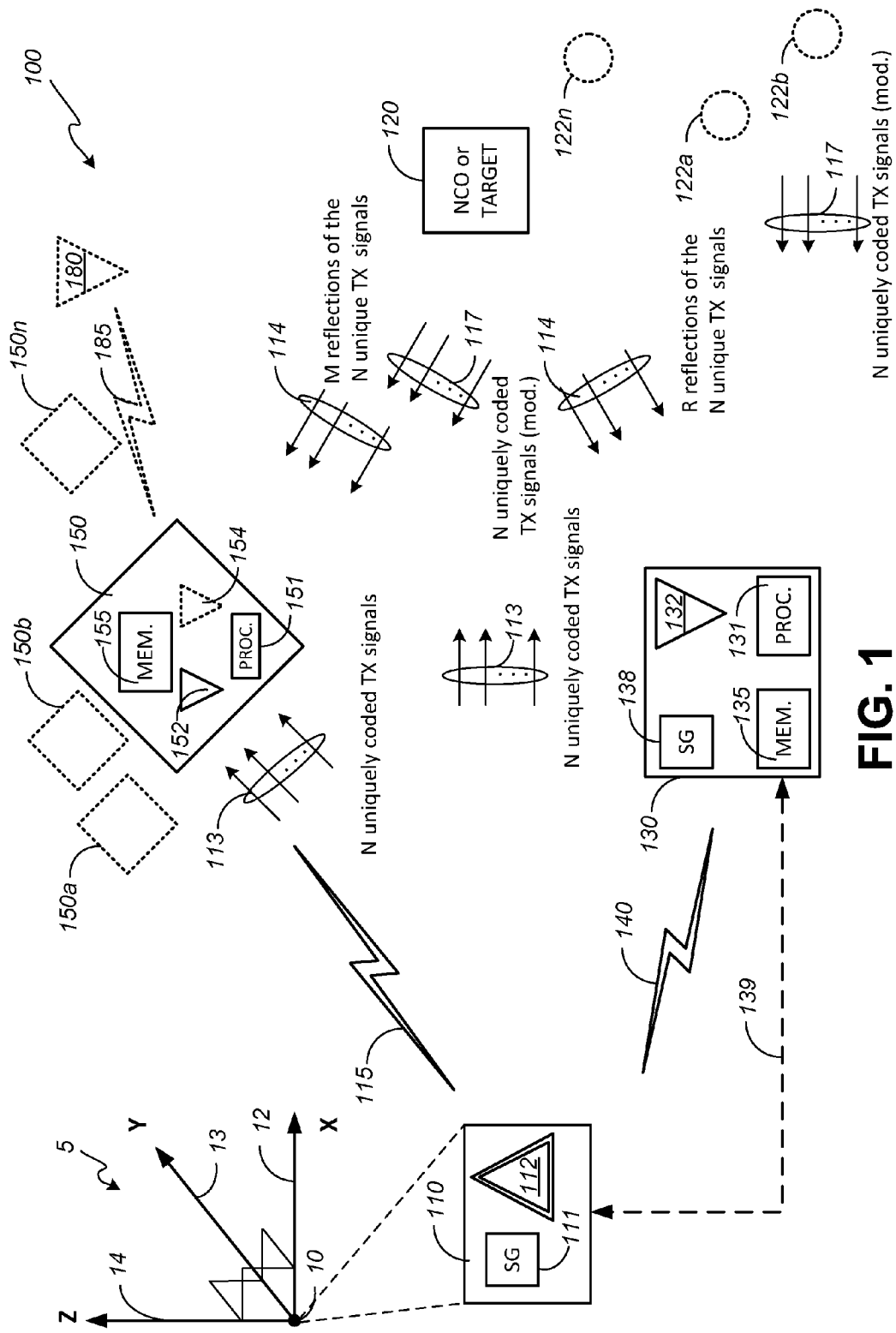
FIG. 1 is a functional block diagram of an example embodiment of an environment in which a sensor system uses coded signals to guide a platform or platforms relative to a non-cooperative object or target.

In accordance with illustrative or exemplary embodiments described herein, a spatially-distributed architecture (SDA) or signal subsystem transmits a set of N uniquely coded electromagnetic signals and receives information from reflected versions of the set of N uniquely-coded signals. The SDA or subsystem determines the position and motion (if any) of a non-cooperative object or target in a coordinate system defined by the SDA by comparing one or more characteristics of the reflected versions of the set of N uniquely-coded signals with the transmitted version of the transmitted signal with the same code. The set of N uniquely-coded signals are also received by a platform. The set of N uniquely-coded signals are received absent reflection from the non-cooperative object or target. The platform self-determines its position, motion, and orientation in the same coordinate system that the SDA or signal subsystem used to determine the position and motion of the non-cooperative object. Since the SDA determines the position and motion of the non-cooperative object and the platform separately self-determines a position, motion and orientation in a common coordinate system, jink maneuvers required by conventional systems for coordinate frame alignment are avoided. Consequently, the improved arrangement provides a savings in guidance system resources and reduces time delays in such navigation or guidance systems. In addition, because the SDA is tracking the target in the same coordinate frame that the platform is self-determining its own position and motion, no frame alignment is required, which also saves guidance system resources and reduces time delays.

In an example embodiment, the platform uses one or more of a self-determined position, motion and orientation of the platform and one or more of a received position, motion and orientation of the non-cooperative object, as communicated by the SDA of antenna arrays, to guide or navigate the platform relative to the non-cooperative object. Such guidance of the platform relative to the non-cooperative object can adapt to present circumstances of the platform and the non-cooperative object in accordance with an operational mode of the platform. For example, in some embodiments the platform may operate in an intercept mode where a collision or near collision between the platform and a non-cooperative object are intended. Whereas, in other operational modes the platform is intended to avoid a non-cooperative object.

In an alternative embodiment a platform is arranged with a third receiver that receives reflections of the uniquely coded signals reflected by the non-cooperative object. In this example, the platform receives the reflected versions of the uniquely coded signals with the third receiver and generates a self-determined position (of the platform) and a platform determined position of the non-cooperative object to guide the platform with respect to the non-cooperative object in the coordinate system.

Example platforms that may use a self-determined position and a received position of a non-cooperative object in a common coordinate system include land-based vehicles and ships or other craft on the surface of a body of water. Other example platforms may include a portable device that is temporarily attached to an article of clothing worn by a person. These example platforms can use embodiments of the disclosed systems in two dimensions or three dimensions. Example non-cooperative objects that a platform may intercept or avoid include other land-based vehicles, ships or other watercraft, natural items and man-made structures.

Other example platforms that may use a self-determined position and a received position of a non-cooperative object in a common coordinate system include, for example, a missile, projectile, aircraft and spacecraft. These example platforms are more likely to use embodiments of the disclosed systems that operate in three dimensions. These non-terrestrial platforms may be guided with respect to non-cooperative objects that are both terrestrial and non-terrestrial. For example, non-cooperative objects in these embodiments may include land-based vehicles, ships or other watercraft, natural items, man-made structures, missiles, projectiles, aircraft and spacecraft.

An example embodiment of a navigation system can take advantage of the self-determined position, motion, and orientation of a platform in the coordinate system defined by the SDA of antenna arrays. For example, a navigation system can be arranged to assist ships as they navigate in or near a harbor. In such an embodiment, a SDA of antenna arrays transmits the uniquely coded signals directly to each ship arranged with a compatible receiver. A ship arranged with a compatible receiver (e.g., a platform) can self-determine a position or location in the coordinate system defined by the SDA of antenna arrays. The ship will also receive one or more signals describing the position and motion (if any) of one or more non-cooperative objects or features in the harbor in the same coordinate system.

In some alternative embodiments, the ship can transmit a signal including one or more identifiers and its self-determined position or location to other ships in the harbor. Or a transponder could be outfitted on each ship or buoy that would receive and retransmit the uniquely coded signals to a second receiver on the ship that would process the signals to determine the location of the ships or buoys in the SDA coordinate frame. In this case a common clock will be required for each ship or platform to determine the range or distance from the SDA to each ship-based receiver. The transponder can be configured to apply a fixed frequency shift to the received uniquely coded signals for enhanced detection in sea clutter and for identification of the transponder platform.

Also the ship may receive a list of known ship or buoy locations in the coordinate system defined by the SDA of antenna arrays from a receiver subsystem in communication with and at a known position relative to the origin defined by the SDA. The list may be provided in a configuration file and stored in a memory element accessible to a processor in communication with the compatible receiver. The list may be provided and stored well before the ship arrives at the entrance to the harbor. Otherwise, the list may be communicated in a signal dedicated for that purpose that is broadcast near the entrance of a harbor. In addition to the ship and buoy locations, the configuration file or local information may further include a set of way points defining a preferred channel or path for ships entering or exiting the harbor. The described navigation system may use a SDA of antenna arrays that define a two-axis coordinate system that compatible receivers can use to describe position, motion and orientation of ships and buoys in the harbor.

In this regard, the improved navigation or guidance systems may be arranged to communicate with cooperative objects in the environment that are outfitted with a suitable transponder. These cooperative transponders receive the N uniquely coded signals and modify the same before transmitting a modified version of the N uniquely coded signals toward a receiver subsystem or a platform or platforms in the environment. Such a device can be arranged to receive, modify, amplify and transmit modified versions of the N uniquely coded signals with a minimal delay. When modified by shifting the frequency by a unique value, the transponder may uniquely identify a cooperative platform such as a ship (which may or may not be moving) or a buoy that is fixed in a harbor. A transponder deployed on a ship could use a frequency shift or adjustment that is significantly greater than that which could be expected from any Doppler shift as a result of a moving surface ship. Furthermore, a suitably arranged transponder on a buoy would enhance the probability of a positive identification during adverse weather and/or high seas.

Similarly, an example embodiment of a navigation system can be arranged to assist planes as they navigate between hangars along a tarmac or even on taxiways and runways of an airport. In such an environment, a SDA of antenna arrays transmits the uniquely coded signals. A plane arranged with a compatible receiver (e.g., a movable platform) can self-determine a position or location in the coordinate system defined by the SDA of antenna arrays. In addition, the plane receives one or more signals indicative of the position and motion (if any) of non-cooperative objects, landmarks, or obstacles in the common coordinate system defined by the SDA of antenna arrays.

In an alternative embodiment, the aircraft can transmit a signal including one or more identifiers and its self-determined position or location to other aircraft at the airport and an optional ground controller. The aircraft may receive a data file or list describing runways, taxiways, outdoor temporary parking locations, hangars, etc. at a particular airport in the coordinate system defined by a local SDA of antenna arrays. The data file, database or list including local information may be provided and stored in a memory element accessible to a processor in communication with the compatible receiver. The airport specific local information may be provided and stored well before the aircraft arrives at the airport. Otherwise, the airport specific information may be communicated in a signal dedicated for that purpose that is broadcast as aircraft enter a controlled airspace near the airport. In addition, the above described data may further include a set of way points defining a preferred course or path for aircraft to use while taxiing from a runway to a particular hangar, gate, refueling station or other select destination at the airport. The described navigation system may use a SDA of antenna arrays that define a two-axis coordinate system that compatible receivers can use to describe position, motion and orientation of aircraft on the ground at the airport.

Another alternative embodiment of a navigation system can be arranged to direct public safety personnel in a building or other structure in the event of an emergency. In this embodiment, a SDA of antenna arrays transmits the uniquely coded signals. A fireman or police officer may be provided a portable device or receiver that can be clipped or otherwise secured to a belt or article of clothing worn by the individual. The portable receiver (e.g., a platform) can self-determine a position or location in the coordinate system defined by the SDA of antenna arrays. In addition, the portable receiver receives one or more signals indicative of the position and motion (if any) of non-cooperative objects, landmarks, or obstacles in the common coordinate system defined by the SDA of antenna arrays.

In an alternative embodiment, the portable receiver may be arranged with a speaker or other output device to provide audible tones or commands to assist the wearer of the portable receiver. In addition, an on-site controller may be provided to coordinate the actions of multiple safety personnel.

In an example embodiment, the portable receiver can transmit a signal including one or more device identifiers and its self-determined position or location to other personnel and an optional emergency coordinator or control entity. The portable receiver may be pre-loaded with a map or floorplan describing the layout of locations within the building. Such layout or local information may include the location of hallways, rooms, cubicles, mechanical rooms, elevators, stairways, etc. for a particular floor of the building in the coordinate system defined by the SDA of antenna arrays. In addition, the above described local information may further include a set of way points defining a preferred course or path to exit the building. The described navigation system may use a SDA of antenna arrays that define a two-axis coordinate system that compatible receivers can use to describe position, motion and orientation of the portable receiver in a coordinate system defined by the SDA of antenna arrays.

In still another example embodiment, additional platforms are arranged with respective second and third receivers. At least a first member of a group of platforms determines its respective distance from the non-cooperative object. At least two additional members of the group of platforms communicate a respective present position and a respective distance to the non-cooperative object in the coordinate system defined by the SDA. With this information, the first member of the group of platforms determines a position of the non-cooperative object in the coordinate system. The first member of the group of platforms communicates the position of the non-cooperative object to one or more of the remaining members of the group of platforms in the common coordinate frame defined by the SDA thereby allowing each platform to implement autonomous guidance relative to the non-cooperative object.

Alternatively, the first member of the group of platforms uses one or more of the position, motion and orientation of the first member of the group of platforms and one or more of the present position, motion and orientation of the non-cooperative object to generate a guidance solution to direct the first member of the group of platforms relative to the non-cooperative object. The first member of the group communicates its position, motion, and orientation to one or more of the remaining members of the group of platforms in the common coordinate frame defined by the SDA. Since the platforms self-determine their position, motion, and orientation in the common frame defined by the SDA, the remaining members of the group of platforms (i.e., those members other than the first member) may determine a respective separation distance and relative direction with respect to the first member of the group of platforms for the entire group of platforms to controllably navigate with respect to the non-cooperative object.

In another example embodiment, a platform includes a third receiver that receives a signal from a source other than the uniquely coded signals that are reflected from the non-cooperative object and other than a cooperative object that transmits a modified version of the N uniquely coded signals. In this example, the platform processor uses information from the signal received by the third receiver to determine a position of the non-cooperative object in a second coordinate system different from the coordinate system defined by the SDA of antenna arrays. However, the transformation from the second coordinate system to the common system defined by the SDA must be made known to the platform.

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

An environment 100 in which an example embodiment of an improved tracking and/or guidance system operates is illustrated in FIG. 1. The improved tracking and/or guidance system includes a spatially-distributed architecture (SDA) or signal generation sub-system 110 that is separated or remotely located from a non-cooperative object or target 120. In the illustrated embodiment, the SDA 110 is arranged or located to the same side of each of the non-cooperative object or target 120, a cooperative object 122, a receiver subsystem or first receiver 130, a platform 150, as well as an alternative signal source 180. The SDA 110, receiver subsystem 130 and platform 150 are not so limited and in modified environments the SDA 110 will be spatially located in other relationships with respect to the receiver subsystem 130, platform 150, non-cooperative object or target 120, cooperative object 122 and the alternative signal source 180.

As indicated schematically in FIG. 1, the SDA 110 defines a first coordinate system 5. The first coordinate system 5 includes an origin 10 where an X-axis 12, a Y-axis 13, and a Z-axis 14 meet. As further indicated schematically in FIG. 1, the X-axis 12 is orthogonal or approximately orthogonal to both of the Y-axis 13 and the Z-axis 14. In addition, the Y-axis 13 is orthogonal or approximately orthogonal to the Z-axis 14. The first coordinate system 5 provides a mechanism to spatially define the relative location and orientation of items in the environment 100. While the origin 10 may be defined at any location within or about the SDA 110, the origin 10 is preferably located at the phase center of the N antenna arrays forming the SDA 110.

In the illustrated embodiment a three-dimensional coordinate space is shown. However, it should be understood that under some circumstances (e.g., operation of a motorized vehicle such as a radio-controlled car, a surface ship, a taxiing aircraft or a car over surfaces where there is little, if any change in one of the orthogonal dimensions) a two-dimensional coordinate space or X-Y plane is still useful for locating or defining a position of a portable device, the surface ship, taxiing aircraft, car or any other signal reflecting item on or near the X-Y plane. The location of non-signal reflective items may be communicated via local information describing an environment 100. As is well known, a position or point on the X-Y plane is identified by two perpendicular lines that intersect each other at the point, which is defined by X-Y coordinates each separately defined by a signed distance from the origin to the respective perpendicular line. Alternatively, each point on a plane can be defined by a polar coordinate system where a point is defined by a distance from a reference point or origin and an angle from a reference direction.

In three dimensions, three perpendicular planes (e.g., a X-Y plane, a Y-Z plane, and a X-Z plane) that intersect each other at an origin are identified and three coordinates of a position or point in the three-dimensional coordinate space are defined by respective signed distances from the point to each of the planes (e.g., point x, y, z). The direction and order for the respective three coordinate axes define a right-hand or a left-hand coordinate system. The first coordinate system 5 is a right-hand coordinate system. Alternative coordinate systems can replace the first coordinate system 5. Such alternatives include a cylindrical coordinate system or a spherical coordinate system.

Wherever located in the environment 100 with respect to the receiver subsystem 130, the platform 150, the non-cooperative object 120, cooperative object 122 and the alternative or optional signal source 180, the SDA 110 generates and controllably transmits N uniquely coded signals 113 where N is a positive integer greater than or equal to two. The SDA or signal generation subsystem 110 includes at least one signal generator 111 and N antenna arrays 112. As indicated in FIG. 1, the N uniquely coded signals 113, generated by and transmitted from the SDA 110, impinge or directly encounter both the non-cooperative object 120 and the platform 150. These non-reflected versions of the N uniquely coded signals 113 are reflected by one or more surfaces of the non-cooperative object or target 120 such that R reflections 114 of the N uniquely coded signals 113 are received by one or more antennas 132 at the first receiver or receiver subsystem 130.

The improved systems and methods for guidance or navigation may be arranged to consider various objects as non-cooperative objects 120 in accordance with an environment of interest. For example, if the system is deployed in a harbor a group of non-cooperative objects 120 may include surface ships and other watercraft, buoys, flotsam, jetsam, etc. By way of further example, when the system is arranged to guide airborne platforms a group of non-cooperative objects 120 may include missiles, projectiles, aircraft, and even spacecraft. In still other examples, a non-cooperative object 120 may include stationary or non-stationary objects supported by land such as, cars, trucks, trains, tanks, fences, buildings, etc. It should be understood that when one or more cooperative objects 122a-122n are present in the environment 100 these cooperative objects 122a-122n may also reflect the N uniquely coded signals 113. Cooperative objects 122 may include any stationary or non-stationary object whether on land, on the surface of a body of water, or airborne that communicates in some way to one of the receiver subsystem, the SDA or the one or more platforms 150.

In the illustrated embodiment, the tracking and/or guidance system 100 includes a receiver subsystem 130 and a platform 150. The SDA 110 may be a fixed station on the ground or a moving station disposed on a moving platform such as, for example, a ship, an airplane, a flying drone, a truck, a tank, or any other type of suitable vehicle (not shown). The SDA 110 includes an array of N antenna elements 112, a signal generator (SG) 111 and other elements (not shown in FIG. 1). The SDA 110 can be collocated with the receiver subsystem 130, or as shown in the illustrated embodiment, is removed from but at a known position in the first coordinate system 5 relative to the origin 10. Together, the SDA 110 and the receiver subsystem 130 determine a position of the target or non-cooperative object 120 in the coordinate system 5. The receiver subsystem 130 is arranged with a radio-frequency communication link to send wireless information signals 140 to the SDA 110. One or more clock signals, synchronization signals or codes may be communicated from the SDA 110 to the receiver subsystem 130 over the radio frequency communication link. Alternatively, the receiver subsystem 130 uses one or more wired connections to send information signals 139 to the SDA 110. In an alternative arrangement, the above described clock signals, synchronization signals or codes are communicated via wired connections from the SDA 110 to the receiver subsystem 130. However arranged, the information signals 139 or the wireless information signals 140 include information responsive to one or more characteristics of the R reflected versions 114 of the N uniquely coded transmit signals 113, where R and N are positive integers and where R is less than or equal to N.

When so desired, the radio-frequency communication link may be arranged to send additional wireless information signals to one or more cooperative objects 122a-122n. These wireless information signals may include local information such as a floor plan, a harbor chart, an airport map, a city map, etc. In addition, the wireless information signals may include transponder configuration parameters. For example, a transponder configuration parameter may include a fixed frequency difference that a particular transponder is directed to apply to the N uniquely coded signals 113 received by the transponder. Each transponder in the environment 100 will be associated with one of the cooperative objects 122a-122n. Otherwise, the transponders associated with the respective cooperative objects 122 may include firmware or stored information that may include local information and a respective modification for the transponder to apply to the received N uniquely coded signals 113 before transmitting modified versions 117 of the N uniquely coded signals. In operation, modified versions 117 of the N uniquely coded signals 113 transmitted from the respective transponders in accordance with a designated modification can be used by one or more platforms 150 to identify the location and motion (if any) of the respective cooperative objects 122 in the coordinate system 5. Example modifications to the uniquely coded signals 113 may include one or more of changes in frequency, time, phase or polarization. A separately identifiable change in any of these parameters or in combinations of these parameters can be used to uniquely identify cooperative objects 122a-122n in the environment 100.

In the example embodiment, the receiver subsystem 130 is arranged with processing circuitry or a processor 131, memory 135, signal generator 138 and one or more antennas 132. The memory 135 includes one or more logic modules and data values (not shown) that when controllably retrieved and executed by the processor 131 enable the processor 131, in response to information derived from the R reflections 114 of the N uniquely coded signals 113 received at the antenna 132, to determine a position of the non-cooperative object 120 in the first coordinate system 5. Changes in the location of the non-cooperative object 120 relative to the SD architecture 110 and/or the receiver subsystem 130 may also be determined by the processor 131. In turn, the processor 131 forwards the location and motion information associated with the non-cooperative object 120 to the signal generator 138 to format, amplify and or buffer the information for communication to the SD architecture 110 via one or both of the communication link 139 and the communication link 140.

One or more of the N antenna arrays 112 or a separate dedicated antenna (not shown) is provided to wirelessly communicate information regarding the location and motion (if any) of the non-cooperative object or target 120 via communication link 115 to the platform 150. The platform 150 uses the location and motion information received from the SDA 110 to track the location of the non-cooperative object 120. In addition, the platform 150 uses both the location and motion information received from the SDA 110 and a self-determined location and motion as inputs to guide or navigate the platform 150 with respect to the non-cooperative object 120. Thus, the platform 150 can be programmed or configured to operate in various modes of operation. For example, when the non-cooperative object 120 is in motion, the platform 150 can be configured to operate in a track mode where movements of the non-cooperative object 120 are recorded by the platform 150. By way of further example, the platform 150 can be configured to track and maintain a specified separation distance from the non-cooperative object or target 120. In another example, when the non-cooperative object 120 is stationary, the platform 150 can be configured to orbit or in some situations avoid the non-cooperative object 120. When so desired, the platform 150 can be operated in an intercept mode that guides or directs one or more control systems of a projectile, missile, ship, airplane, drone, land-based vehicle, portable receiver etc., supporting the platform 150 to intercept the non-cooperative object or target 120. An intercept condition occurs when the platform 150 moves within a desired distance of or contacts the non-cooperative object 120.

The platform 150 uses the location and motion information received from the SDA 110 to track the location of the non-cooperative object 120. Furthermore, the platform 150 uses both the location and motion information received from the SDA 110 and a self-determined location and motion as inputs to guide or navigate the platform 150 with respect to the non-cooperative object 120. Moreover, the platform 150 uses modified versions 117 of the N uniquely coded signals 113 to also locate, identify and determine relative motion (if any) of one or more cooperative objects 122a-122n that might be located in the environment 100. Thus, the platform 150 can be further programmed or configured to avoid and/or track both cooperative objects 122a-122n as well as non-cooperative object 120.

In the example embodiment, the platform 150 is arranged with processing circuitry or a processor 151, memory 155, and one or more antennas 152. Platform 150 may be fixed to one or more of a missile, a projectile, a ship, an airplane, a flying drone, a truck, a tank, or any other type of suitable vehicle or even a relatively small portable device (not shown). When the platform 150 is coupled to or part of a projectile, the platform 150 may be dropped, launched, expelled or otherwise separated from a ship, airplane, drone, or land-based vehicle. The one or more antennas 152 receive the N uniquely coded transmit signals 113 transmitted by the SDA 110. The memory 155 includes one or more logic modules and data values (not shown) that when controllably retrieved and executed by the processor 151 enable the processor 151, in response to information derived from the N uniquely coded signals 113 as received at the antennas 152, to self-determine a position of the platform 150 in the coordinate system 5. Changes in the location of the platform 150 relative to the SDA 110 may also be determined by the processor 151. In addition, one or more of the antennas 152 or a dedicated antenna (not shown) may receive information identifying the location and motion (if any) of the non-cooperative object 120 as communicated by the SDA 110 via the communication link 115. Thus, the one or more logic modules and stored data values can be transferred to the processor 151 to enable any one of the described or other operational modes.

As also illustrated in FIG. 1, an optional or alternative signal source 180 (or a set of such signal sources) may communicate an information signal 185 to the platform 150. The information signal 185 may be received by one or more of the antennas 152 one or more of the optional antennas 154 and or a dedicated antenna (not shown). In an example embodiment, the information signal 185 includes location, motion (if any) and orientation of the non-cooperative object 120 in accordance with a coordinate system other than the coordinate system 5. For example, the information signal 185 may include location as defined by latitude, longitude (in degrees, minutes, seconds format or in decimal format) and altitude in meters with respect to sea level as determined by a global positioning system (GPS) receiver or a signal source responsive to such a system. By way of further example, the platform 150 may be arranged with a GPS receiver (not shown) and the information signals 185 may each include a specific pseudorandom code known to the receiver, a time of transmission and the location of the satellite broadcasting the respective signal. In still other examples, the respective information signal may be sent from an airborne platform arranged with a synthetic aperture array that has identified a structure or other non-cooperative object 120. However configured, when the location of the non-cooperative object 120 is provided to the platform 150 in a coordinate system other than the coordinate system 5 a conversion operation will be necessary for the platform 150 to determine its distance to the non-cooperative object or target 120.

As also illustrated by way of dashed lines, the platform 150 may be accompanied by one or more instances of separate platforms 150a-150n. When so provided, each member of the group of platforms 150a-150n is arranged with one or more positioning antennas 152 and one or more tracking antennas 154. As described, the positioning antennas 152 receive the N uniquely coded signals 113 transmitted from the SDA 110 and the tracking antennas 154 receive reflected versions 114 of the N uniquely coded signals that are reflected by the non-cooperative object 120. When so arranged, at least one of the platforms 150 includes a respective platform processor (not shown) that determines a distance to the non-cooperative object 120. The platform 150 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The platform(s) 150 may be arranged with dedicated transceivers and signal processors (not shown) for communicating with the remaining platforms 150a-150n.

In addition, the platform 150 communicates a self-determined position, motion and orientation and the calculated position of the non-cooperative object 120 in the coordinate frame 5 to other members of the group of platforms. Furthermore, the platform 150 may be arranged to generate a guidance or navigation solution to direct platform 150 with respect to the non-cooperative object 120. Such guidance solutions may include instructions that direct control systems on the platform 150 to follow or intercept a moving non-cooperative object 120, or to orbit or intercept a stationary non-cooperative object 120. In some embodiments, such guidance or navigation solutions may generate control signals that direct the platform along an intended path, route or channel. In these embodiments, the guidance or navigation solutions may be arranged or programmed to avoid various objects in the environment 100. In embodiments where multiple platforms 150a-150n are deployed each platform 150 will separately determine a guidance solution. Moreover, information may be shared with other members of the group of platforms 150a-150n. Such information may assist a platform 150 that is not receiving reflected versions 114 of the uniquely coded signals 113 to continue in a direction or path towards the non-cooperative object or target 120 until such time that whatever was blocking the path of the reflected signals is no longer in the way.

When so arranged, at least one of the platforms 150 includes a respective platform processor (not shown) that determines a distance to the non-cooperative object 120. The platform 150 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The platform(s) 150 may be arranged with dedicated transceivers and signal processors (not shown) for communicating with the remaining platforms 150a-150n.

As further illustrated by way of dashed lines, the environment 100 may include one or more cooperative objects 122a-122n. When so provided, one or more platforms 150a-150n arranged with one or more positioning antennas 152 and one or more tracking antennas 154 will receive the N uniquely coded signals 113 transmitted from the SDA 110, the reflected versions 114 of the N uniquely coded signals that are reflected from a non-cooperative object 120 and modified versions 117 of the N uniquely coded signals 113 that are received, modified and transmitted from the one or more cooperative objects 122a-122n. Both the positioning antennas 152 and the tracking antennas 154 may receive the N uniquely coded signals 113 transmitted from the SDA 110, the reflected versions 114 of the N uniquely coded signals and the modified versions 117 of the N uniquely coded signals 113 transmitted from the one or more cooperative objects 122a-122n. It should be understood that for some arrangements of the platform positioning antennas 152 and platform tracking antennas 154 and respective signal processing circuits there may be situations where a frequency shift used by a transponder in a cooperative object 122 is large enough that the processing circuits coupled to the tracking antennas 154 may tune to a frequency band that is outside of the detectible range of the positioning antennas and the respective processing circuits. In these arrangements, the tracking antennas 154 and respective processing circuits will receive and process the modified versions 117 of the N uniquely coded signals 113, while the positioning antennas 152 and respective processing circuits will receive and process the N uniquely coded signals 113 sent from the SDA 110.

Figure 2A:
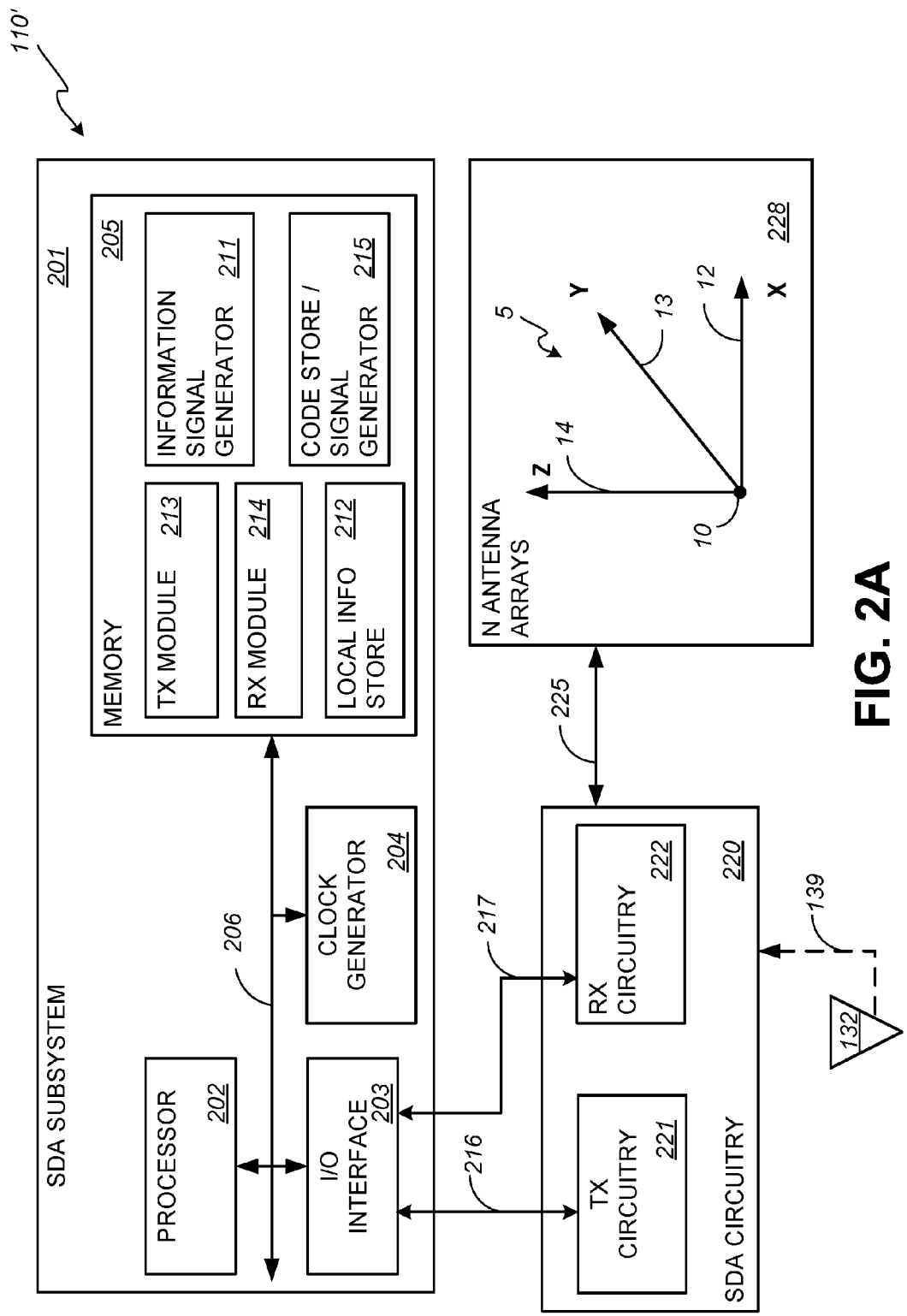
FIG. 2A is a schematic diagram of an example embodiment of the spatially distributed architecture (SDA) introduced in the sensor system of FIG. 1.

FIG. 2A illustrates an example embodiment of the SDA 110 introduced in FIG. 1. In the illustrated embodiment, the SDA 110' includes a SDA subsystem 201, SDA circuitry 220 and N antenna arrays 228. As indicated, the N antenna arrays 228 define the coordinate system 5 introduced in FIG. 1. The SDA subsystem 201 includes a processor 202, input/output (I/O) interface 203, clock generator 204 and memory 205 coupled to one another via a bus or local interface 206. The bus or local interface 206 can be, for example but not limited to, one or more wired or wireless connections, as is known in the art. The bus or local interface 206 may have additional elements, which are omitted for simplicity, such as controllers, buffers (caches), drivers, repeaters, and receivers (e.g. circuit elements), to enable communications. In addition, the bus or local interface 206 may include address, control, power and/or data connections to enable appropriate communications among the aforementioned components.

The processor 202 executes software (i.e., programs or sets of executable instructions), particularly the instructions in the information signal generator 211, TX module 213, RX module 214, and code store/signal generator 215 stored in the memory 205. The processor 202 in accordance with one or more of the mentioned generators or modules may retrieve and buffer data from the local information store 212. The processor 202 can be any custom made or commercially available processor, a central processing unit (CPU), an auxiliary processor among several processors associated with the SDA subsystem 201, a semiconductor based microprocessor (in the form of a microchip or chip set), and application specific integrated circuit (ASIC) or generally any device for executing instructions.

The clock generator 204 provides one or more periodic signals to coordinate data transfers along bus or local interface 206. The clock generator 204 also provides one or more periodic signals that are communicated via the I/O interface 203 over connection 216 to the TX circuitry 221. In addition, the clock generator 204 also provides one or more periodic signals that are communicated via the I/O interface 203 over connection 217 to the RX circuitry 222. The one or more periodic signals forwarded to the SDA circuitry 220 enable the SDA 110' to coordinate the transmission of the N uniquely coded signals 113 to the N antenna arrays 228 via the connections 225 and the reception of informative signals from the receiver subsystem 130 via the N antenna arrays 228 or the optional connection 139. The I/O interface 203 includes controllers, buffers (caches), drivers, repeaters, and receivers (e.g. circuit elements), to enable communications between the SDA subsystem 201 and the SDA circuitry 220.

The memory 205 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM)). Moreover, the memory 205 may incorporate electronic, magnetic, optical, and/or other types of storage media. Note that the memory 205 can have a distributed architecture, where various components are situated remote from one another, but can be accessed by the processor 202.

The information signal generator 211 includes executable instructions and data that when buffered and executed by the processor 202 generate and forward a signal or signals that communicate at least P electrical measurements made by the first receiver in response to the reflections 114 of the N uniquely coded signals 113 transmitted by the N transmit arrays 228, where P is a positive integer. Alternatively, the information signal generator 211 includes executable instructions and data that when buffered and executed by the processor 202 generate and forward a signal or signals that communicate a position and motion (if any) of the non-cooperative object 120 in the coordinate system 5.

The code store/signal generator 215 includes executable instructions and data that when buffered and executed by the processor 202 generate and forward a set of N signals that are encoded or arranged in a manner that enable a receiver of the N signals, such as, the receiver subsystem 130, the platform 150, or both to separately identify each of the N signals at location separate from the SDA 110'. The TX module 213 includes executable instructions and data that when buffered and executed by the processor 202 enable the SDA subsystem 201 to communicate a set of uniquely identifiable signals to a spatially distributed architecture (SDA) of N antenna arrays 228, where N is a positive integer greater than or equal to two, the arrangement of the N antenna arrays defining the coordinate system 5. The TX module 213 includes executable instructions and data that when buffered and executed by the processor 202 enable the SDA subsystem 201 to receive reflected versions 114 of the set of uniquely identifiable signals 113 transmitted from the SDA of N antenna arrays 212 and reflected by the non-cooperative object 120 and determine a location of the non-cooperative object 120 in the first coordinate system 5 based on a respective time and phase of reflected versions of the uniquely identified signals and an angular position and a range of the receiver subsystem 130 relative to an origin of the first coordinate system 5.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 2B illustrates an alternative embodiment of the SDA circuitry 220' introduced in FIG. 2A. In the illustrated embodiment, the receiver subsystem 130 is in close proximity to the transmit circuitry 221'. The receiver subsystem 130 includes antenna 132 and receive circuitry 222. The antenna 132 converts electromagnetic energy in the R reflections of the N unique coded signals 114 that arrive at the antenna 132 to electrical signals. The electrical signals are forwarded to the receive circuitry 222 where they are filtered and amplified. The transmit circuitry 221' includes a master oscillator (MO) 223, a synchronization clock (SYNC CLK) 224, a set of transmit signal generators 226a-226n and a respective set of antennas 228a-228n. The master oscillator 223 generates a common carrier frequency that is distributed to each of the transmit signal generators 226a-226n and to the synchronization clock 224. The synchronization clock 224 adjusts the common carrier frequency and forwards respective codes to each of the respective transmit signal generators 226a-226n. The synchronization clock 224 may divide the common carrier frequency by a factor before forwarding the codes. In turn, the transmit signal generators 226a-226n modulate the common carrier frequency with the respective codes and convert the common carrier frequency to a radio frequency. An output of each of the transmit signal generators 226a-226n is coupled to an input of a respective antenna 228a-228n. The antennas 228 receive the electrical signals produced by the transmit signal generators 226a-226n and convert the coded electrical signals to an over-the-air electromagnetic wave.

Although the illustrated embodiment shows the transmit signal generators 226a-226n and antennas 228a-228n in a one-to-one relationship, two or more of the transmit signal generators 226a-226n may share an antenna. Preferably, the transmit signal generators 226a-226n are augmented by a digital signal processor (not shown) that spatially directs the set of N uniquely coded transmit signals 113 in the environment 100. Such directivity or beamforming techniques controllably direct the radio-frequency electromagnetic energy in a predictable way. Accordingly, a control system (not shown) or other source of information identifying a region of interest in the environment 100 may direct the SDA circuitry 220' to send the set of N uniquely coded transmit signals 113 in the general direction of a target or non-cooperative object 120. Similarly, the control system or other source of information identifying a region in the environment 100 where a platform 150 is expected to be located may direct the SDA circuitry 220' to send the set of N uniquely coded transmit signals 113 in the general direction of the platform 150.

The set of N uniquely coded signals 113 produced by the transmit signal generators 226a-226n are preferably orthogonal, or nearly orthogonal, to each other. This orthogonal coding enables the individual signals to be distinguished from one another at the receiver subsystem 130. There are common signal coding and signal processing techniques that are suitable for this purpose, including, for example, time-division multiplexing, frequency-division multiplexing, code-division multiplexing, and polarization coding. For some environments a combination of one or more of these coding and signal processing techniques can be used to generate a set of signals that do not interfere with one another and are thus separately identifiable.

The antennas 228a-228n are spatially distributed in such a way that a small positional difference of the non-cooperative object or target 120 being tracked produces a relatively large differential path length between the R reflections of the N uniquely coded signals 114 that encounter the antenna 132. The antennas 228a-228n may be arranged in formations that are planar or nonplanar. When supported by a structure or a vehicle the size of the formation will be limited only by the dimensions of the underlying structure or vehicle chosen to support the antennas 228a-228n. However supported, the antennas 228a-228n are spatially distributed in such a way that a small positional difference between an array of antennas 152 arranged on an platform 150 produces a relatively large differential path length between the N uniquely coded signals 113 that encounter the antennas 152.

Figure 3A:
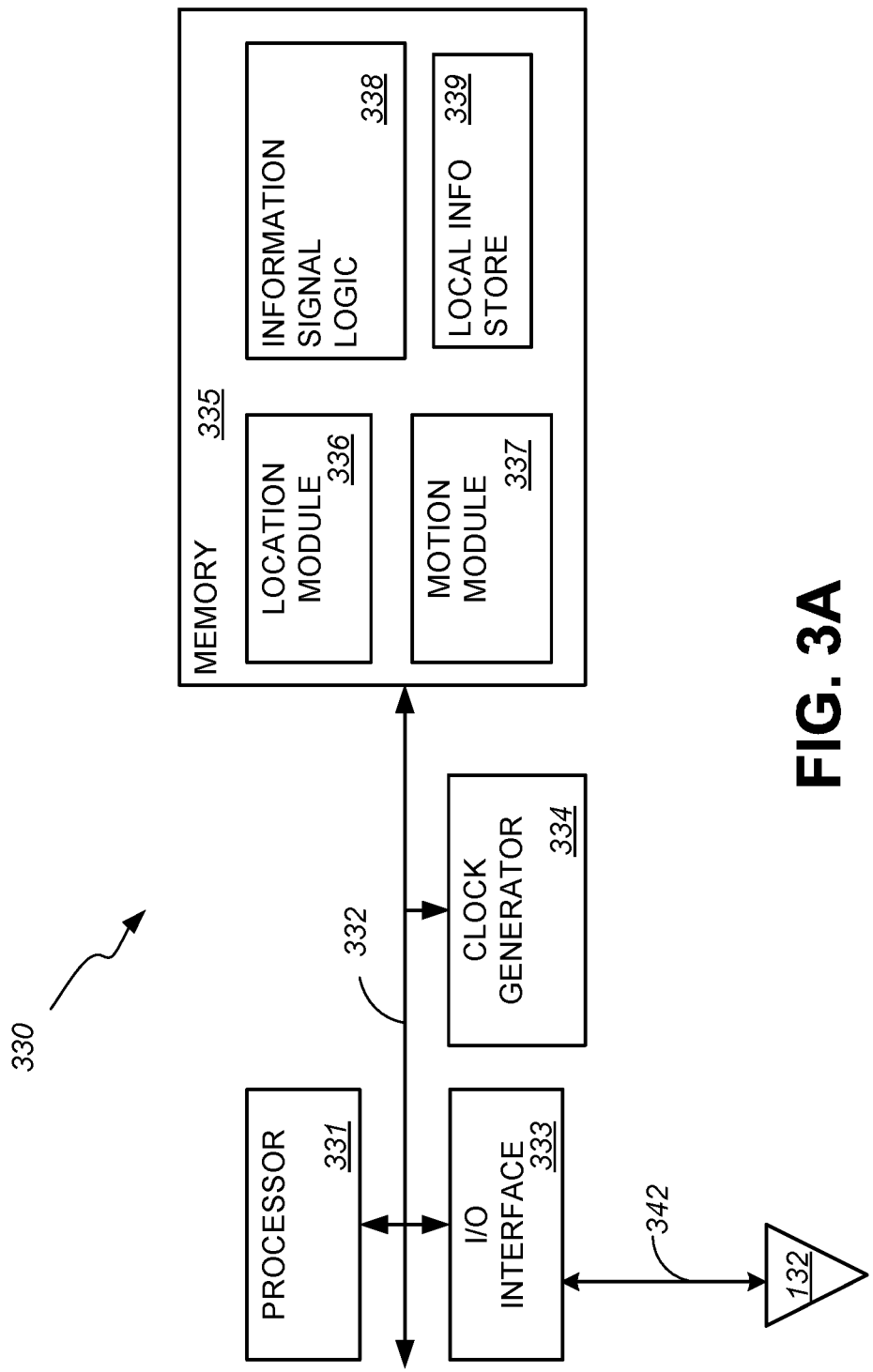
FIG. 3A is a schematic diagram of an example embodiment of the first receiver of FIG. 1.

FIG. 3A illustrates an example embodiment of the receiver subsystem 130 introduced in FIG. 1. In the illustrated embodiment, the receiver subsystem 330 includes a processor 331, I/O interface 333, clock generator 334 and memory 335 coupled to one another via a bus or local interface 332. The bus or local interface 332 can be, for example but not limited to, one or more wired or wireless connections, as is known in the art. The bus or local interface 332 may have additional elements, which are omitted for simplicity, such as controllers, buffers (caches), drivers, repeaters, and receivers (e.g. circuit elements), to enable communications. In addition, the bus or local interface 332 may include address, control, power and/or data connections to enable appropriate communications among the aforementioned components.

The processor 331 executes software (i.e., programs or sets of executable instructions), particularly the instructions in the location module 336, motion module 337 and information signal logic 338 stored in the memory 335. The processor 331 in accordance with one or more of the mentioned modules or logic may retrieve and buffer data from the local information store 339. The processor 331 can be any custom made or commercially available processor, a CPU, an auxiliary processor among several processors associated receiver subsystem 330, a semiconductor based microprocessor (in the form of a microchip or chip set), an ASIC or generally any device for executing instructions.

The clock generator 334 provides one or more periodic signals to coordinate data transfers along bus or local interface 332. The clock generator 334 also provides one or more periodic signals that are communicated via the I/O interface 333 over connection 342 to communicate wirelessly via antenna(s) 132 or connection 139 when the receiver subsystem 330 is proximal to the SDA 110'. In addition, the clock generator 334 also provides one or more periodic signals that enable the receiver subsystem 330 to coordinate the transmission of informative signals. The I/O interface 333 includes controllers, buffers (caches), drivers, repeaters, and receivers (e.g. circuit elements), to enable communications between the receiver subsystem 330 and the SDA subsystem 201.

The memory 335 can include any one or combination of volatile memory elements (e.g., RAM, DRAM, SRAM, SDRAM, etc.) and non-volatile memory elements (e.g., ROM). Moreover, the memory 335 may incorporate electronic, magnetic, optical, and/or other types of storage media. Note that the memory 335 can have a distributed architecture, where various components are situated remote from one another, but can be accessed by the processor 331.

The location module 336 includes executable instructions and data that when buffered and executed by the processor 331 generate and forward information to information signal logic 338 such as at least P electrical measurements made by the first receiver subsystem 330 in response to the reflections 114 of the N uniquely coded signals 113 transmitted by the N transmit arrays 228, where P is a positive integer. Alternatively, the location module 336 may be arranged to forward a location in X, Y, Z coordinates relative to the origin 10 of the coordinate system 5.

Motion module 337 includes executable instructions and data that when buffered and executed by the processor 331 determine and forward motion information to information signal logic 338 such motion information may include velocity vector values in X, Y, Z coordinates relative to the origin 10 of the coordinate system 5.

Information signal logic 338 includes executable instructions and data that when buffered and executed by the processor 331 generate and forward a signal or signals that communicate a position and motion (if any) of the non-cooperative object 120 in the coordinate system 5. In some embodiments, the information signal logic 338 may generate signals that provide local information to one or more cooperative objects 122a-122n. The information signal logic 338 may also generate signals that include one or more configuration parameters intended to be communicated to respective cooperative objects 122a-122n.

As indicated, local information store 339 may include data describing a local map, chart, floorplan, etc. The local information store 339 may include locations of fixed items in the coordinate system 5 defined by the SDA 110. The included data may also define one or more preferred paths, routes, or channels for the platform 150 to use. This included data may be communicated directly or indirectly from the receiver subsystem 330 to the platform(s) 150 as may be desired. In addition, the data in local information store 339 may receive updates or real-time information regarding the environment 100. Such real-time updates may include the position of both fixed structures and moving platforms 150a-150n in the local environment 100. In some arrangements, the local information store 339 may also receive information including the position and motion (if any) of one or more cooperative objects 122a-122n present in the environment 100.

Figure 3B:
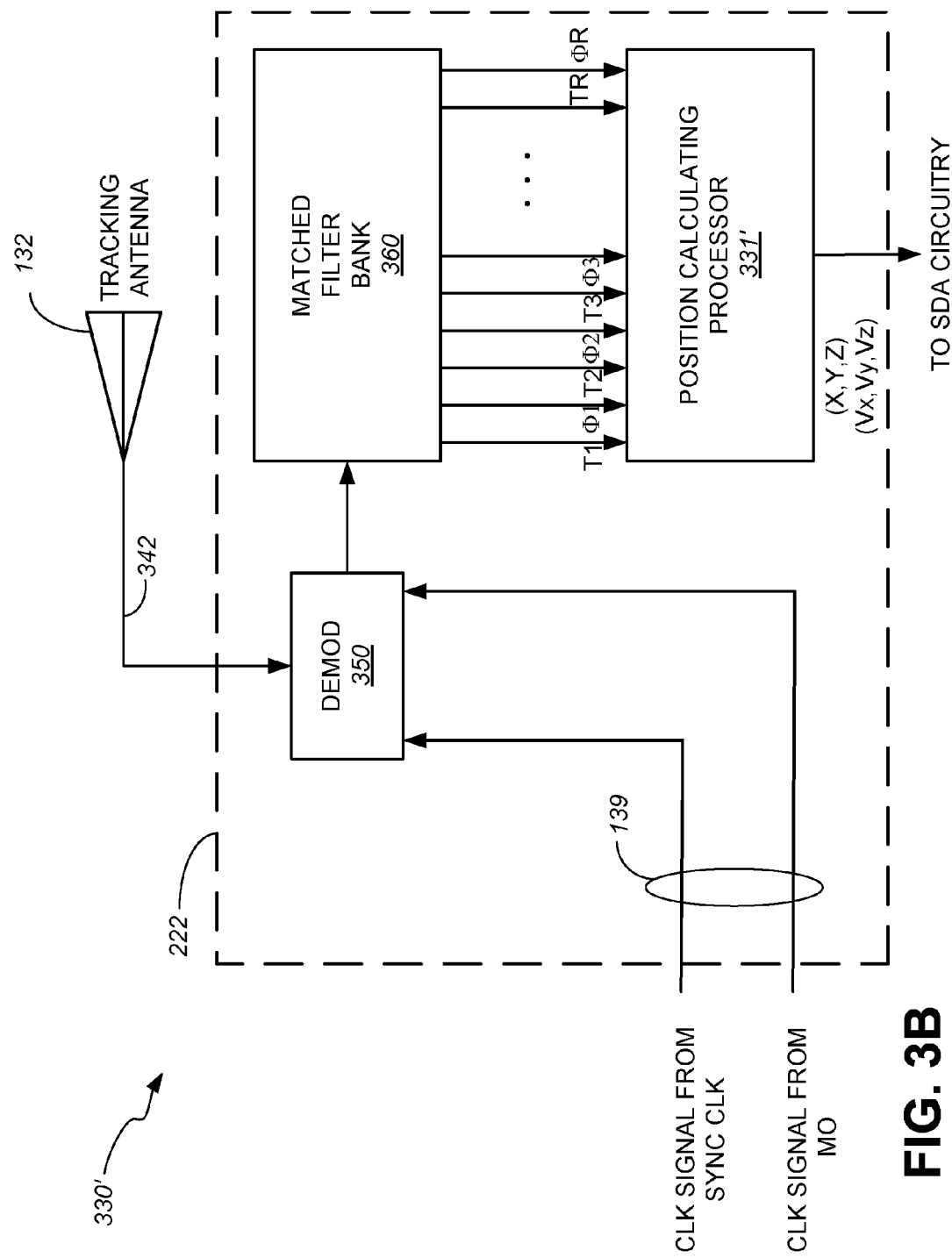
FIG. 3B is a schematic diagram of an alternative embodiment of the first receiver of FIG. 1.

FIG. 3B illustrates a functional block diagram of an embodiment of a receiver subsystem 330'. The receiver subsystem 330' includes receiver circuitry 222 and one or more tracking antennas 132. The receiver circuitry 222 is configured to operate in conjunction with the transmit circuitry 221, 221' shown in FIG. 1 and FIG. 2B. In the illustrated arrangement, the receiver circuitry 222 includes a demodulator (DEMOD) 350, matched filter bank 360 and a position calculating processor 331'. The demodulator 350 receives respective signals from the synchronization clock 224 (FIG. 2B) and the master oscillator 223 (FIG. 2B) as well as electrical signals from the tracking antennas 132 on connection 342. The tracking antenna(s) 132 receives electromagnetic energy transmitted by the transmit circuitry 221 (FIG. 2A) and reflected off of the non-cooperative object or target 120 being tracked. The tracking antenna 132 may be a single antenna or an array of antennas. For ease of discussion, it will be assumed that the tracking antenna 132 is a single antenna. The demodulator 350 receives the carrier frequency from the master oscillator 223 and the synchronization clock 224 from the SDA circuitry 220', which enable the demodulator 350 to demodulate and decode the R reflections of the N uniquely coded signals 114. A matched filter bank 360 of the receiver circuitry 222 receives the demodulated signal from the demodulator 350 and filters the signal to separate the reflections of the N uniquely coded signals 114 from one another and determine the time, T, and phase, $\phi$, of each respective signal. As further indicated in FIG. 3B, separate time, T(r), and phase, $\phi(r)$ signals are forwarded to the position calculating processor 331', which determines present X, Y, Z coordinate values in the coordinate system 5. In this way, the position calculating processor 331' determines a present position of the non-cooperative object 120. In addition, the position calculating processor 331' uses separate instances of present X, Y, Z coordinate values separated by a known time to determine a change in position of the non-cooperative object 120 over the known time. The position calculating processor 331' divides the respective changes in position in each of the three coordinate directions to determine a velocity of the non-cooperating object 120 in each of the X, Y, and Z directions of the coordinate system 5. In addition, the position calculating processor 331' can apply similar logic to determine a present position and motion (if any) of a cooperative object 122.

Figure 4A:
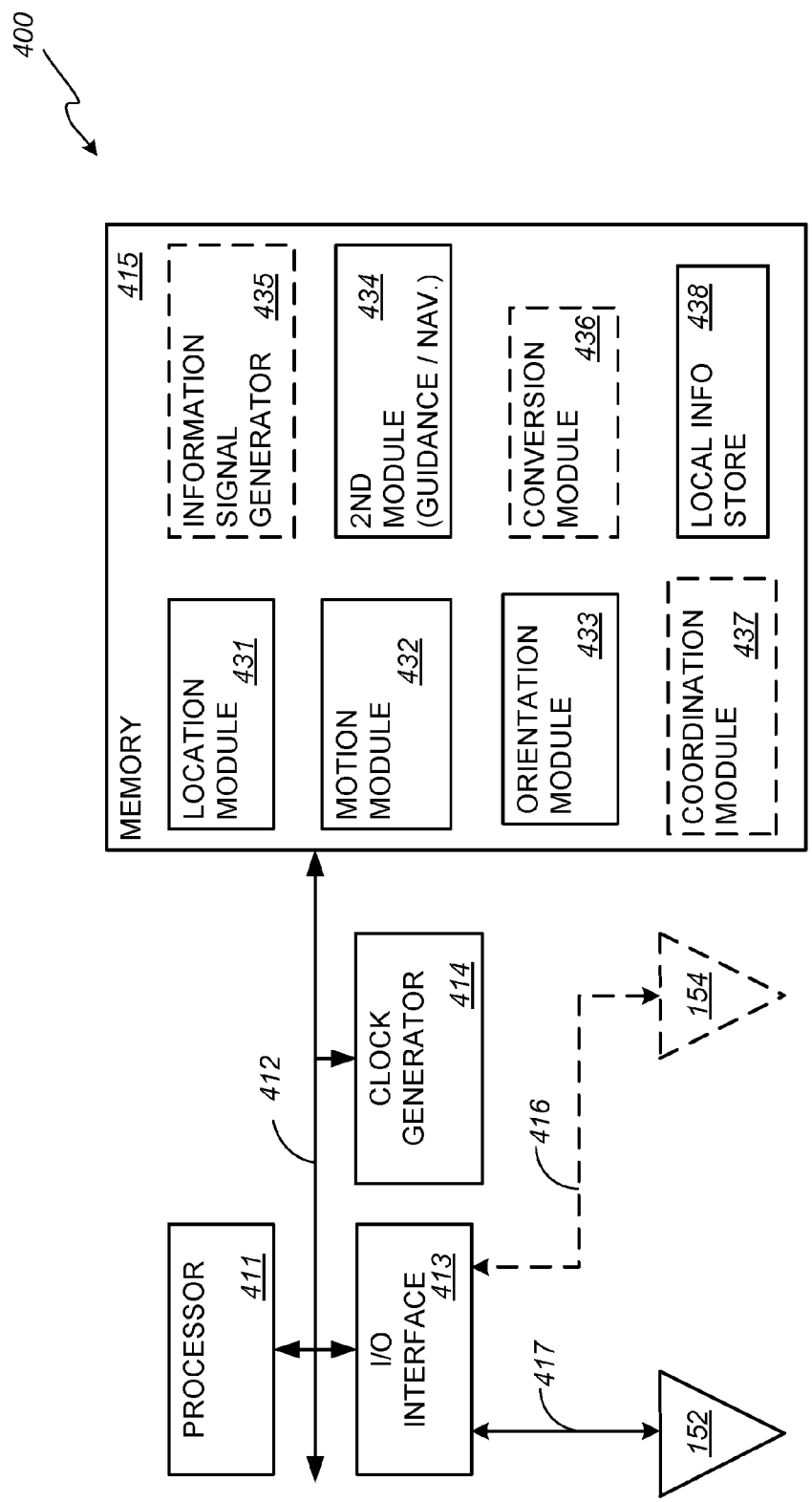
FIG. 4A is a schematic diagram of an example embodiment of a platform introduced in FIG. 1.

FIG. 4A illustrates a functional block diagram of an embodiment of a platform 400. In the illustrated embodiment, the platform 400 includes a processor 411, I/O interface 413, clock generator 414 and memory 415 coupled to one another via a bus or local interface 412. The bus or local interface 412 can be, for example but not limited to, one or more wired or wireless connections, as is known in the art. The bus or local interface 412 may have additional elements, which are omitted for simplicity, such as controllers, buffers (caches), drivers, repeaters, and receivers (e.g. circuit elements), to enable communications. In addition, the bus or local interface 412 may include address, control, power and/or data connections to enable appropriate communications among the aforementioned components.

The processor 411 executes software (i.e., programs or sets of executable instructions), particularly the instructions in the location module 431, motion module 432, orientation module 433 and guidance module 434 stored in the memory 415. The processor 411 can be any custom made or commercially available processor, a CPU, an auxiliary processor among several processors associated with the platform 400, a semiconductor based microprocessor (in the form of a microchip or chip set), an ASIC or generally any device for executing instructions.

The clock generator 414 provides one or more periodic signals to coordinate data transfers along bus or local interface 412. The clock generator 414 also provides one or more periodic signals that are communicated via the I/O interface 413 over connection 417 to communicate wirelessly via antenna(s) 152 or over connection 416 via optional antenna 154. In addition, the clock generator 414 also provides one or more periodic signals that enable the platform 400 to coordinate the transmission of informative signals. The I/O interface 413 includes controllers, buffers (caches), drivers, repeaters, and receivers (e.g. circuit elements), to enable communications between the platform 150 and optional platforms 150a-150n.

The memory 415 can include any one or combination of volatile memory elements (e.g., RAM, DRAM, SRAM, SDRAM, etc.) and non-volatile memory elements (e.g., ROM). Moreover, the memory 415 may incorporate electronic, magnetic, optical, and/or other types of storage media. Note that the memory 415 can have a distributed architecture, where various components are situated remote from one another, but can be accessed by the processor 411.

The location module 431 includes executable instructions and data that when buffered and executed by the processor 411 generate and forward information to information signal generator 435 such as an platform location in X, Y, Z coordinates relative to the origin 10 of the coordinate system 5. The motion module 432 includes executable instructions and data that when buffered and executed by the processor 411 determine and forward motion information to information signal generator 435. Such motion information may include velocity vector values in X, Y, Z coordinates responsive to motion of the platform 400 relative to the origin 10 of the coordinate system 5. The orientation module 433 includes executable instructions and data that when buffered and executed by the processor 411 determine and forward orientation information to information signal generator 435. Such orientation information may include a roll angle and an orientation vector in X, Y, Z coordinates responsive to a present condition of the platform 400 relative to the origin 10 of the coordinate system 5. When such orientation information is recorded and observed over time a roll rate over a select period of time may be determined.

Generally, a roll axis or longitudinal axis passes through a missile, projectile or aircraft from a respective nose to a respective tail. An angular displacement about this axis is called bank. A pilot of a winged aircraft changes the bank angle by increasing lift on one wing and decreasing it on the other. The ailerons are the primary control surfaces that effect bank. For fixed wing aircraft, the aircraft's rudder also has a secondary effect on bank. A missile will use other control surfaces to achieve a desired bank angle, while a projectile may be launched with an intentional roll rate that rotates or spins the projectile about its longitudinal axis.

The term pitch is used to describe motion of a ship, aircraft, or vehicle about a horizontal axis perpendicular to the direction of motion. A pitch axis passes through the aircraft from wingtip to wingtip. Pitch moves the aircraft's nose up or down relative to the pitch axis. An aircraft's elevator is the primary control surface that effects pitch. Yaw is a term used to describe a twisting or oscillation of a moving ship or aircraft around a vertical axis. A vertical yaw axis is defined to be perpendicular to the wings and to the normal line or path of flight with its origin at the center of gravity and directed towards the bottom of the aircraft. Relative movement about the yaw axis moves the nose of the aircraft from side to side. An aircraft's rudder is a control surface that primarily effects yaw.

A roll rate and an orientation of the platform 150 can be determined from a comparison of the polarization of signals transmitted from the antennas 228a-228n with respect to a gravity (or up-down vector) that may align with the Z direction of the coordinate system 5. By aligning the polarization of the transmitted signals with the polarization of the antennas 152a-152n the orientation of the up-down vector can be tracked in time to provide the pitch, roll, and yaw orientation of the platform 150 as a function of time in the coordinate frame 5. In addition, a similar alignment of the polarization of the transmitted signals with the polarization of the optional antenna(s) 154 the orientation of the up-down vector can be tracked in time to provide additional information concerning the pitch, roll and yaw orientation of the platform 150 as a function of time. For missiles and projectiles the antennas 152a-152n may be rearward facing whereas optional antenna(s) 154 may be forward facing. For these form factors, orientation information in the form of pitch and yaw information may be determined from signals received at both the antennas 152a-152n and the antenna(s) 154, while roll orientation information may be determined solely from the antennas 152a-152n.

Alternatively for these form factors, platform orientation including each of pitch, yaw and roll may be determined from the signals received by the antennas 152a-152n alone, from the signals received by the antenna(s) 154 alone, or platform orientation including pitch, yaw and roll maybe determined from signals received by the antennas 152a-152n and the antenna(s) 154.

This orientation information is sent to the guidance/navigation module 434 which includes executable instructions and data that when buffered and executed by the processor 411 generate and forward information or control signals to one or more control systems (not shown) of the platform 400. Such control systems may be arranged to navigate or otherwise direct operation of the platform 400 in accordance with information from various sensors in combination with information in local information store 438. As described, the position and motion (if any) of the non-cooperative object 120 in the coordinate system 5 are communicated to the platform 400. In environments that include cooperative objects 122a-122n with suitably arranged transponders, the platform 400 may also receive the position and motion (if any) of the cooperative objects 122a-122n. As described, cooperative objects 122a-122n may be uniquely identified using a transponder that is arranged or directed to apply a separately identifiable modification to the uniquely coded signals 113. For example a time modification could change the time of retransmit to identify the cooperative object. To identify a select cooperative object 122, the modified signal can be transmitted using a time code (staggered pulses that represent a unique time sequence). By way of further example, the phase structure can also be modified by multiplying a sequence of SDA waveforms by a sequence of phase rotations that uniquely identify the object. The position and motion of the cooperative objects 122a-122n may be communicated to the platform 400 via the receiver subsystem 130 and the SDA 110. In addition, the position, motion and orientation of the platform 400 are self-determined in the coordinate system 5. The position and motion (if any) of the platform 400 in conjunction with data in the local information store 438 (including location and motion (if any) of the non-cooperative object 120 and cooperative objects 122a-122n) are forwarded to the guidance/navigation module 434. Thus, a coordinate conversion is not necessarily required on the platform 150. One or more control signals generated by the guidance/navigation module 434 controllably direct the platform 400 with respect to the non-cooperative object 120 and the one or more cooperative objects 122 (when present) in light of the local information describing conditions in the environment 100.

However, in some embodiments the platform 400 may be arranged to receive information concerning the non-cooperative object 120 from an alternate signal source that will typically be in a coordinate frame that is different from that defined by the coordinate system 5. For example, the alternate signal source 180 may provide a location and motion (if any) of the non-cooperative object 120 in a GPS format. When this is the case, an optional conversion module 436 may be arranged with executable instructions and data that when buffered and executed by the processor 411 perform a coordinate conversion to translate a GPS data format to the coordinate system 5. Alternatively, the conversion module 436 may be capable of translating information identifying the location, motion and orientation of the platform 400 in the coordinate system 5 to the GPS data format received from the alternate signal source 180. Upon conversion, the converted information may be communicated to the guidance module 434 and or forwarded to one or more control systems provided on the platform 150.

As further explained in association with an optional embodiment illustrated in FIG. 1, the platform 150 may be a member of a group of similarly configured platforms 150a-150n. When this is the case, the platform 400 may be arranged with an optional coordination module 437 that includes executable instructions and data that when buffered and executed by the processor 411 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The coordination module 437 may further enable the platform 400 to communicate a self-determined position, motion and orientation and the calculated position of the non-cooperative object 120 in the coordinate frame 5 to other members of the group of platforms. Furthermore, the platform 400 may be arranged to generate a guidance solution for one or more of the other members of the group of platforms 150a-150n.

Figure 4B:
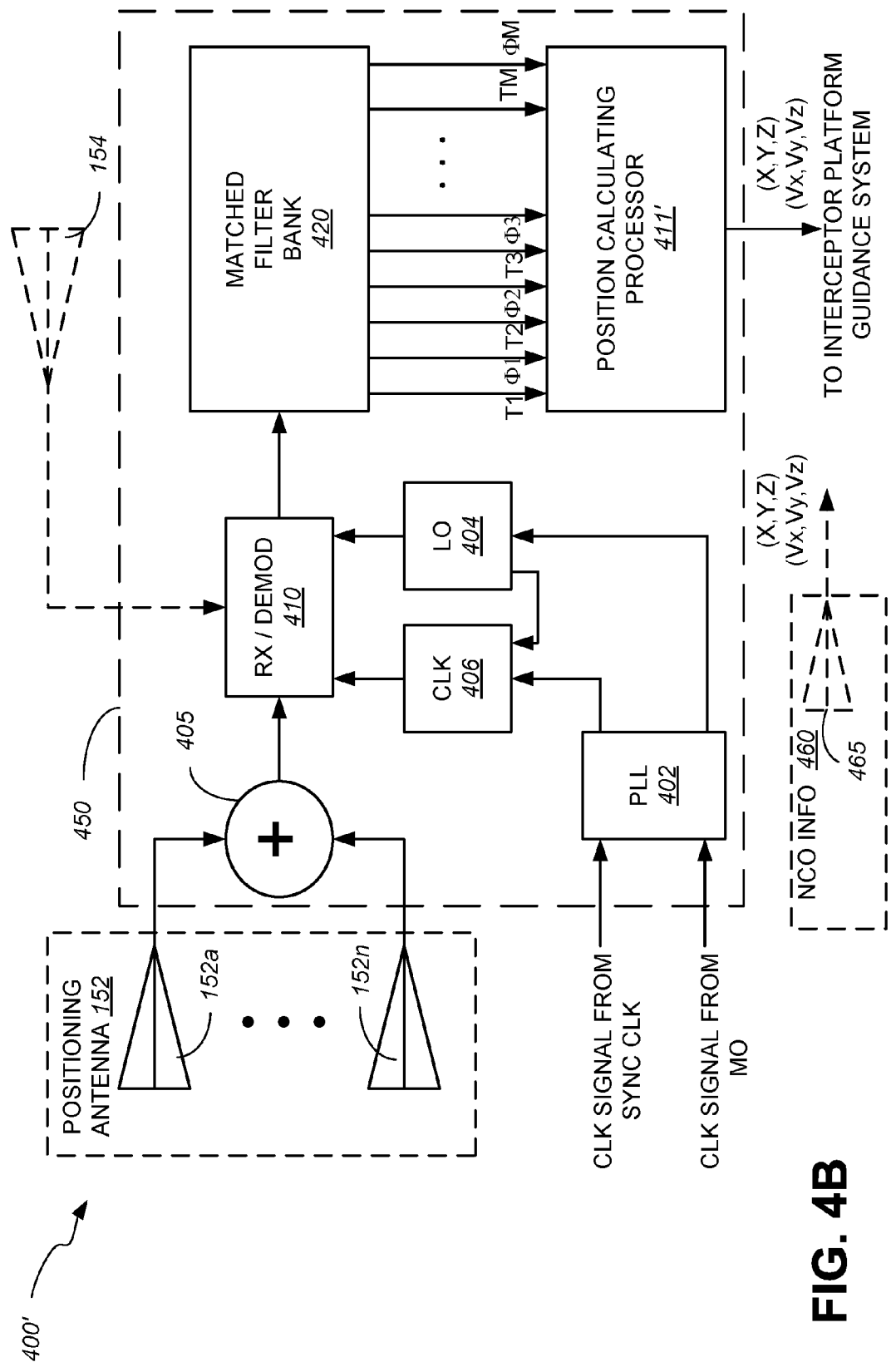
FIG. 4B is a schematic diagram of an alternative embodiment of the platform of FIG. 1.

FIG. 4B illustrates a functional block diagram of an embodiment of a platform 400'. The platform 400' includes platform circuitry 450, one or more positioning antennas 152a-152n and one or more optional antennas 154. The platform circuitry 450 is configured to operate in conjunction with signals from the transmit circuitry 221, 221' shown in FIG. 1 and FIG. 2B. In the illustrated arrangement, the platform circuitry 450 includes a summing node 405, receiver demodulator (RX/DEMOD) 410, matched filter bank 420 and a position calculating processor 411'. The platform circuitry 450 further includes a phase-locked loop (PLL) 402, local oscillator (LO) 404, and a local clock 406. The LO 404 provides a clock signal to the receiver demodulator 410 that is at the same frequency as the MO 223 of the SDA circuitry 220, which enables the receiver demodulator 410 to locate the set of uniquely coded signals 113 transmitted from the SDA 110. The local clock 406 is used by the receiver demodulator 410 to demodulate the set of uniquely coded signals 113. The LO 404 and the local clock 406 preferably are synchronized to the MO 223 and the synchronization clock 224, respectively, just before or shortly after launch of a missile, or deployment of the platform 150 by using the PLL 402 in the platform circuitry 450 to phase align the clock signal generated by LO 404 with the clock signal generated by MO 223. The positioning antenna(s) 152a-152n receive electromagnetic energy directly transmitted by the transmit circuitry 221 (FIG. 2A). The positioning antenna 152 may be a single antenna or an array of antennas. However arranged, the summing node 405 receives the separate electrical signals provided by the positioning antenna 152 and forwards a composite signal to the receiver demodulator 410. The receiver demodulator 410 receives the carrier frequency from the local oscillator 404 and the synchronization clock signal from the local clock 406, which enable the receiver demodulator 410 to demodulate and decode the N uniquely coded signals 113. A matched filter bank 420 receives the demodulated signals from the receiver demodulator 410 and filters the signals to separate the N uniquely coded signals 113 from one another and determines the time, T, and phase, $\phi$, of each respective signal. As further indicated in FIG. 4B, separate time, T(r), and phase, $\phi(r)$ signals are forwarded to the position calculating processor 411', which determines present X, Y, Z coordinate values in the coordinate system 5. In this way, the position calculating processor 411' determines a present position of the platform 150. In addition, the position calculating processor 411' uses separate instances of present X, Y, Z coordinate values separated by a known time to determine a change in position of the platform 150 over the known time. The position calculating processor 411' divides the respective changes in position in each of the three coordinate directions to determine a velocity of the platform 150 in each of the X, Y, and Z directions of the coordinate system 5.

As indicated in the illustrated embodiment, the platform 400' may be arranged with a receiver 460 for receiving over-the-air information signals. The over-the-air information signals may include information signal 115 generated and transmitted from the SDA 110 or information signal 185 generated and transmitted from an alternate signal source 180. The electromagnetic waves in the over-the-air information signals are converted to electrical signals by the antenna 465. The electrical signals may be filtered, demodulated and amplified to convey location and motion information responsive to the non-cooperative object 120. Furthermore, the electrical signals converted by the antenna 465 may be buffered over time at the receiver 460 to determine changes in each of the X, Y, and Z coordinates over a specified time. When the over-the-air signals are generated and transmitted from the SDA 110, the location and velocity of the non-cooperative object 120 are identified using X, Y, Z coordinates in the coordinate system 5. When the over-the-air signals are transmitted from an alternative signal source 180, the location and velocity of the non-cooperative object 120 may be provided in an alternate coordinate system different from the coordinate system 5. For example, the location of the non-cooperative object 120 may be provided in GPS coordinates or other three-dimensional coordinate systems. When the location of the non-cooperative object 120 is provided in a coordinate system that is different from the coordinate system 5, the platform processor 151 or some other processor will perform a coordinate transformation. Preferably, the platform processor 151 will convert or transform the location of the non-cooperative object 120 to the coordinate system 5.

As further indicated in the illustrated embodiment, the platform 400' may optionally be arranged with one or more tracking antennas 154. When so provided, the one or more tracking antennas 154 receive M reflected versions 114 of the N uniquely coded signals 113, where M is an integer less than or equal to N. For ease of discussion, the tracking antenna 154 is a single antenna. The electrical signal(s) received by the tracking antenna(s) 154 are forwarded to the receiver demodulator 410. The receiver demodulator 410 demodulates the reflected versions of the N uniquely coded signals. The demodulated signals are forwarded to the matched filter bank 420, which separates the reflected versions 114 of the N uniquely coded signals 113 from each other. The electrical signals representative of the over-the-air signals transmitted directly from the SDA 110 to the platform 150 traverse a first set of paths. Whereas, the electrical signals representative of the reflected versions of the over-the-air signals as received at the tracking antennas 154 have traversed from the SDA 110 to the non-cooperative object 120 and from there to the platform 150. Consequently, the time and phase of each of these reflected signals will not be the same as the time and phase of the signals received at the positioning antennas 152. When provided both sets of signals, the position calculating processor 411' determines a platform position and a non-cooperative object position in the coordinate system 5. In addition, when provided both sets of signals over time, the position calculating processor 411' uses separate instances of present X, Y, Z coordinate values separated by a known time to determine a change in position of the platform 150 over the known time and to determine a change in position of the non-cooperative object 120 over the known time. The position calculating processor 411' divides the respective changes in position of each of the platform 150 and the non-cooperative object 120 in each of the three coordinate directions to determine a respective velocity of the platform 150 and the non-cooperative object 120 in each of the X, Y, and Z directions of the coordinate system 5. In addition, the position calculating processor 411' can apply similar logic to determine a present position and motion (if any) of a cooperative object 122.

For example, let $s_1(t-t_0)$ and $s_2(t-t_0)$ denote two signals transmitted from transmitters A and B respectively where $t_0$ is the time of transmit. Assume that signal $s_1$ is received at the first receiver at absolute time $t_1$ and the signal $s_2$ is received at the second receiver at absolute time $t_2$. Assuming, a common frequency, an amplitude propagation model for these signals is defined by equation 1 and equation 2.

$$s_1(t-t_0)=e^{2\pi j f(t_1-t_0)} \text{ and } s_2(t-t_0)=e^{2\pi j f(t_2-t_0)} \quad \text{Equations 1 and 2}$$

The phase of the signals is defined by equations 3 and 4.

$$\phi_1=2\pi f(t_1-t_0) \text{ and } \phi_2=2\pi f(t_2-t_0) \quad \text{Equations 3 and 4}$$

The differential time, $t_d$, is related to the differential phase, $\phi_d$, as shown in equation 5.

$$t_d = t_1 - t_2 = \frac{1}{2\pi f}(\varphi_1 - \varphi_2) = \frac{\varphi_d}{2\pi f} \quad \text{Equation 5}$$

Thus, the time difference and phase difference are linearly related. Therefore, the terms time difference and phase difference refer to equivalent measured quantities up to a multiplier and resolving any ambiguities in phase.

A position calculating processor 131 of the receiver subsystem 130 performs a position-calculating algorithm, which calculates the X, Y and Z Cartesian (or polar) coordinates of the non-cooperative object 120 and the velocity of the non-cooperative object in the X, Y and Z Cartesian (or polar) directions in coordinate system 5 determined by the location of the antenna arrays 112 in the SDA architecture 110. The manner in which these calculations are made is described below with reference to FIGS. 5-9. The position and velocity information output by the processor 131 is then sent to the SDA 110 via connection 139 or wireless communication link 140. In turn, the SDA 110 transmits or communicates the position and motion of the non-cooperative object 120 to the platform 150 where a guidance solution is computed using the interceptor position and motion computed on the platform.

The use of multiple fixed polarized positioning antennas 152a-152n or a single rotating polarized positioning antenna 152 at the platform 150 enable the roll rate and orientation of the platform 150 with respect to a gravity vector to be determined. The polarization of the signals transmitted by the antennas 228a-228n can be arranged to align with a known up-down vector (gravity) at the location of the SDA 110. By aligning the polarization of the transmitted signals with the polarization of the antennas 152a-152n the orientation of the up-down vector can be tracked in time to provide the pitch, roll, and yaw orientation of the platform 150 as a function of time in the coordinate frame 5 determined by the location of the antennas 228a-228n of the SDA 110. This orientation information is sent to the guidance system (not shown) of the platform 150.

Once the processor 151 of the platform 150 receives the coordinates of the position and velocity of the platform 150 and the coordinates of the position and velocity of the non-cooperative object 120, a guidance solution is computed and the guidance system of the platform 150 makes any necessary correction to the flight path of the platform 150 to ensure that it is on course to intercept the non-cooperative object 120. It should be noted that because the position and velocity of the platform 150 and of the non-cooperative object 120 are in the same coordinate frame, no frame alignment is needed, which provides the aforementioned advantages over the conventional command guidance fire control systems.

The processor 151 of the platform 150 could be responsible for computing the guidance solution or, alternatively, a separate processor on the platform 150 (not shown) could perform the task of computing the guidance solution. The platform 150 may be further arranged with a navigation control system or autopilot system (not shown) that includes a processor that converts the guidance solution into actual guidance commands or control signals that are then delivered to one or more servos or other control signal converters that adjust the position of one or more control surfaces (not shown) arranged on the platform 150. Such control systems change the direction of the platform 150 based on the guidance commands or control signals. The processor 151 of the platform 150 may generate the guidance commands and deliver them to the guidance system, or a processor of the autopilot system may perform this function. As will be understood by persons of skill in the art, in view of the description provided herein, processing tasks may be performed by a single processor or distributed across multiple processors.

The receiver subsystem 130 and the platform 150 determine differential time and/or phase and absolute time-of-arrival measurements of the uniquely coded signals transmitted from the set of antennas 228a-228n. These time-based measurements and knowledge of the speed of the signal propagation enable calculations to be made of the differential and absolute path lengths over which the signals have traveled. These measured path lengths, in conjunction with knowledge of the distributed layout of the antennas 228 of the SDA 110 and the known spatial relationship between the receiver subsystem 130 and the SDA 110, are used by the processor 131 and the processor 151 in the receiver subsystem 130 and the platform 150, respectively. Based on this information, the receiver subsystem 130 determines the position and motion of the non-cooperative object 120 relative to the SDA 110 and the platform 150 self-determines its position and motion relative to the SDA 110.

The determinations made by the receiver subsystem 130 are communicated to the SDA 110 and transmitted over-the-air to the platform 150. These determinations are then combined with the determinations made by the processor 151 of the platform 150 to provide the platform 150 with the position and motion of the non-cooperative object 120 relative to the platform 150 to compute a guidance solution.

The times-of-arrival of the transmitted uniquely coded signals 113 at the receiver subsystem 130 and the platform 150 are measured and the differences between these times are calculated. The differential time calculations obtained by the receiver subsystem 130 and knowledge of the layout of the SDA 110 and its spatial relationship with the antenna(s) 132 of the receiver subsystem 130 are used by the processor 131 to determine the path lengths from the antennas 228a-228n to the non-cooperative object 120. The differential time calculations obtained by the platform 150 and knowledge of the layout of the SDA 110 are used by the processor 151 to determine the path lengths from the antennas 228a-228n to the positioning antenna(s) 152 on the platform 150. Because the clocks that are used by the transmit signal generators 226a-226n, the receiver subsystem 130 and the platform 150 are synchronized, as described above with reference to FIG. 2B, FIG. 3B and FIG. 4B, the absolute arrival times of the signals can be determined by the receiver subsystem 130 and the platform 150. The absolute arrival times can be used to determine the absolute ranges, and consequently, the full position vectors can be determined. These same principles can be applied to locate and determine relative motion (if any) of cooperative objects that receive, modify and transmit modified versions of the N uniquely coded signals.

The processor 131 and the processor 151 determine the path lengths by measuring the difference in time-of-arrival of the signals as described above or by measuring the differential phase φ of the signals. Use of relative phase measurements is called interferometry. Interferometry requires coherence in the transmit signal generators 226a-226n. While either technique can be used to calculate the angle-of-arrival, the relative accuracy of the measurements is not the same. Interferometry improves the accuracy of this process by comparing the relative phase shifts of the received signals to provide a very accurate angle measurement.

In example embodiments motion is determined using the determined range and the differential change in the range of the signal propagation paths. Once the differential change in each path length has been determined, the combination of these values allows the platform 150 to self-determine its motion and allows the receiver subsystem 130 to determine the motion of the non-cooperative object 120 by multiplying the unit position vector by the differential path length change. The algorithms that are executed by the processor 151 and the processor 131 to compute the positions and motions of the non-cooperative object 120 and of the platform 150, respectively, include straight-forward trigonometric calculations as will now be described with reference to FIGS. 5-9.

Figure 5:
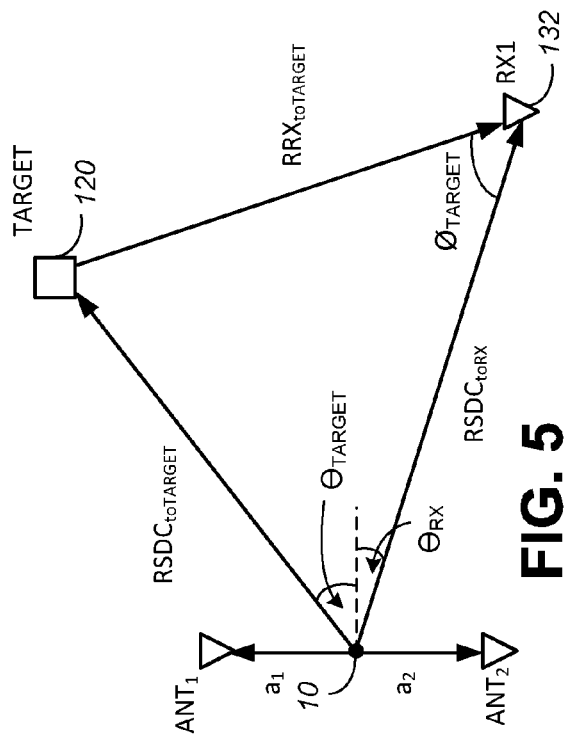
FIG. 5 is a schematic diagram that illustrates the manner in which the position and orientation of a target or non-cooperative object relative to the receiver of FIG. 1 can be determined in two dimensions.

FIG. 5 is a schematic diagram that illustrates the manner in which the position and orientation of a target or non-cooperative object 120 relative to the receiver platform 130 of FIG. 1 can be determined in two dimensions using trigonometry. An example spatial relationship (not to scale) between a set of antennas, $ANT_1$ and $ANT_2$, a receiver, RX1, and a reflective non-cooperative object or target 120 are shown in two dimensions in FIG. 5. An origin 10 is located equidistant between $ANT_1$ and $ANT_2$ when the distance a1 between the origin 10 and $ANT_1$ is equal to the distance $a_2$ between the origin 10 and the $ANT_2$. Stated another way, the origin 10 is the overall phase center of a spatially-distributed architecture of N antenna arrays comprising $ANT_1$ and $ANT_2$. The range, $|RSDC_{toTARGET}|$ from center of the SDA (i.e., origin 10) to the target 120 and angular position, $\theta_{TARGET}$, of the object relative to the origin 10 can be determined by the receiver subsystem 130 based on the known spatial relationship between the origin 10 and the antenna 132 by using the measurements of the difference in time-of-arrival of the signals as described above or the differences in the phase φ of the signals. The range, $|RSDC_{toRX1}|$ from origin 10 to the antenna 132 and the angular position, $\theta_{RX}$, of the antenna 132 relative to the origin 10 are known a priori. Consequently, the range, $|RRX_{toTARGET}|$, from the antenna 132 to the target 120 and the angle, $\phi_{Object}$, of the target relative to the antenna 132 can be determined by the processor 131 of the receiver subsystem 130 using trigonometry, as will be understood by persons skilled in the art in view of the description provided herein.

Figure 6:
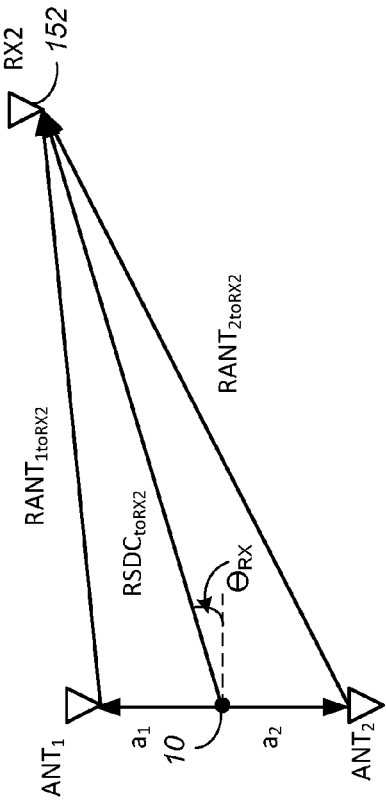
FIG. 6 is a schematic diagram that illustrates the manner in which the position and orientation of the second receiver relative to the SDA of FIG. 1 can be determined in two dimensions.

FIG. 6 is a schematic diagram that illustrates the manner in which the position and orientation (not to scale) of the second receiver located on an platform 150 remote from the origin 10 defined by the SDA 110 of FIG. 1 can be determined in two dimensions using trigonometry. In FIG. 6, $a_1$, $a_2$, $RANT_{1toRX2}$, $RANT_{2toRX2}$, and $RSDC_{toRX2}$ are vectors. Given a known distance ($|a_1|, |-a_2|$) between the respective antennas $ANT_1$ and $ANT_2$ and the origin 10, the differential distance ($|RANT_{1toRX2}| - |RANT_{2toRX2}|$) from $ANT_1$ and $ANT_2$ to RX2 can be computed. RX2 is the overall phase center of the positioning antenna(s) 152 located on the platform 150. Using this information, the angle $\theta_{RX}$ can be determined, where $\theta_{RX}$ is the angle between the perpendicular to the line between the antennas $ANT_1$ and $ANT_2$ and the line to the antennas 152 from the origin 10. This may be accomplished by measuring the difference in time-of-arrival of the signals from each antenna 228a-228n (FIG. 2B) and multiplying by the speed of the signal propagation or by relating the phase difference to time difference. In two dimensions, the differential range measurements and the angle $\theta_{RX}$ are related by the equation, $$|RANT_{1toRX2}| - |RANT_{2toRX2}| = (|a_1 - a_2|)\sin \theta_{RX}, \quad \text{Equation 6}$$

If the receiver clock (e.g., clock 406) is synchronized with the transmitter clock (e.g., synchronization clock 224), it is possible to determine not only the relative difference in arrival time of the signals transmitted from $ANT_1$ and $ANT_2$ to RX2, but also the absolute arrival time of the transmitted signals at RX2. Using this information, it is then possible to determine the distance from RX2 to each of the antennas $ANT_1$ and $ANT_2$. Using standard trigonometric equations, the distance from RX2 to the origin 10 can be determined. As will now be described, this two-dimensional system can be extended easily to three dimensions by adding one or more additional antennas and one or more respective unique codes.

Figure 7:
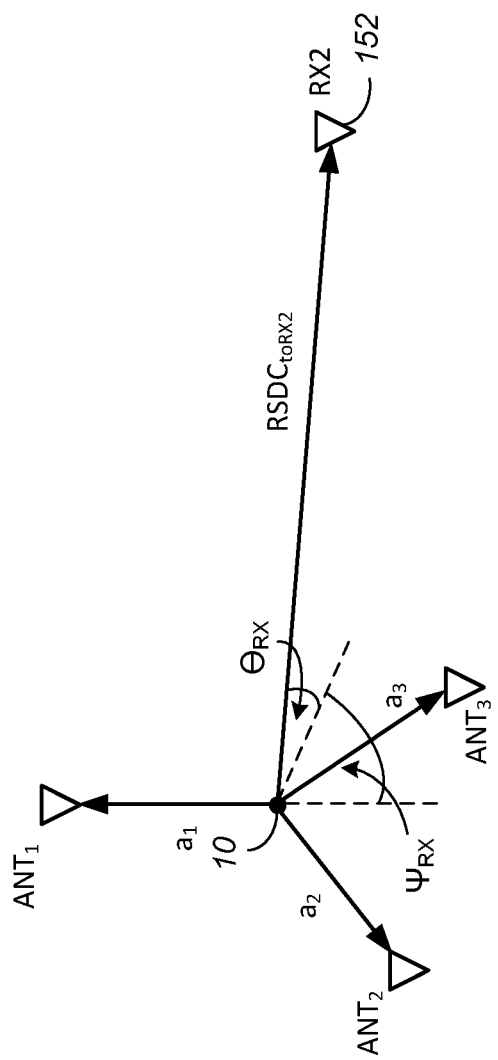
FIG. 7 is a schematic diagram that illustrates the manner in which the position and orientation of the second receiver relative to the SDA of FIG. 1 can be determined in three dimensions.

FIG. 7 is a schematic diagram that illustrates the manner in which the position and orientation (not to scale) of the second receiver located on an platform 150 remote from the origin 10 defined by the SDA 110 of FIG. 1 can be determined in three dimensions. The example embodiment shows relationships between three antennas, $ANT_1$, $ANT_2$ and $ANT_3$, and the positioning antennas 152 in the platform 150, labeled RX2, in three dimensions. As indicated, there are two angles ($\theta_{RX}$, $\psi_{RX}$) that need to be computed to determine position. However, these angles can be determined from algebraic equations with well-established solutions. The solution to the resulting position equations follows, under the assumption of synchronized clocks and that the coordinate frame center (e.g., origin 10) is located at the centroid of the antenna location vectors $a_1$, $a_2$, $a_3$, i.e., $$Tx \text{ Center} = (0 \ 0 \ 0) = \frac{a_1 + a_2 + a_3}{3} \quad \text{Equation 7}$$

And it follows that $$|RSDC_{toRX2}|^2 =$$

-continued $$\frac{|RANT_{1toRX2}|^2 + |RANT_{2toRX2}|^2 + |RANT_{3toRX2}|^2}{3} - \frac{|a_1|^2 + |a_2|^2 + |a_3|^2}{3},$$

and assuming Tx Center=(0 0 0), $$RSDC_{toRX2} \cdot a_1 = \frac{|RANT_{1toRX2}|^2 - |RSDC_{toRX2}|^2 - |a_1|^2}{2}$$

$$RSDC_{toRX2} \cdot a_2 = \frac{|RANT_{2toRX2}|^2 - |RSDC_{toRX2}|^2 - |a_2|^2}{2}$$

$$RSDC_{toRX2} \cdot a_3 = \frac{|RANT_{3toRX2}|^2 - |RSDC_{toRX2}|^2 - |a_3|^2}{3}$$

The term $RSDC_{toRX2}$ represents the vector from the center of the array of N antennas or origin 10, to the receiver center, RX2, or antenna 152 (when one antenna is used). The terms $RANT_{1toRX2}$, $RANT_{2toRX2}$, $RANT_{3toRX2}$ represent the vectors from the antennas $ANT_1$, $ANT_2$ and $ANT_3$, respectively, to RX2. The terms $a_1$, $a_2$, and $a_3$ represent the vectors from the origin 10 to each of the antennas $ANT_1$, $ANT_2$ and $ANTT_3$, respectively. The derivation of these equations will be understood by those skilled in the art in view of this description.

FIG. 8 is a diagram that illustrates the relationship, in two dimensions, between two antennas, $ANT_1$ and $ANT_2$, one receiver platform antenna 132, RX1, and a target or non-cooperative object 120 being tracked. It should be noted once again, that in three dimensions, there are more choices for how to arrange the antennas. In addition, there are more equations to be solved and two angles that need to be computed to determine position. However, as indicated above, the equations that may be used for this are algebraic equations with well-established solutions that will be understood by those skilled in the art.

Because the position of the first receiver subsystem 130 relative the SDA 110 is known a priori, the position of any object reflecting the uniquely coded transmitted signals 113 towards the first receiver subsystem 130 and more specifically the antenna (or RX1) 132 can be determined. With reference to FIG. 8, the values of the vectors ($a_1$, $a_2$, $RTC_{toRX1}$) and the angles $\theta_{RX}$ and $\varnothing_{RX1}$ are all known, while the values of the vectors ($R_{TCtoTARGET}$, $RRX1_{toTARGET}$, $RANT_{1toTARGET}$, $RANT_{2toTARGET}$) and the angles $\theta_{TARGET}$ and $\varnothing_{TARGET}$ are unknown. However, because the signals that reflect off of the object share a common path along $RRX1_{toTARGET}$, the difference in arrival times at the receiver subsystem 130 is entirely due to the difference in length of the vectors $RANT_{1toTARGET}$ and $RANT_{2toTARGET}$. This information is enough to allow the angle of the target relative to the antennas 228a-228n to be calculated in the coordinate frame 5 defined by the positions of the antennas. In two dimensions, assuming $|a_1|=|a_2|$, the differential range measurements and the angle relative to the SDA center or origin 10 are related by the equation:

$$|RANT_{1toTARGET}| - |RANT_{2toTARGET}| = (|a_1 - a_2|)\sin\theta_{TARGET}.$$

As stated above, if the local clocks of the SDA 110 and the receiver subsystem 130 are synchronized, it is possible to determine not only the relative difference in arrival time of the signals from each antennas 228a-228n, and consequently the angular position of the target 120, but also the absolute arrival time of the transmitted signals, which, in conjunction with the known position of the receiver subsystem 130 relative to the origin 10, gives the range of the target 120 in the coordinate system 5 determined by the location of the antennas 228 in the SDA 110. However, unlike the calculation used to determine the range of the receiver, this calculation requires the simultaneous solution of intersecting ellipses. Methods exist, such as, for example, the gradient descent and Newton-Raphson methods, that are suitable for use with the invention to solve the resulting set of equations. Those skilled in the art will understand the manner in which these or other methods may be used to make these calculations. This two-dimensional system can be extended easily to three dimensions by using one or more additional antennas that broadcast one or more respective uniquely coded signals.

FIG. 9 is a schematic diagram that illustrates spatial relationships in an example arrangement of a SDA 110, a receiver subsystem 130 with multiple antennas and a non-cooperative object or target 120 of FIG. 1 in two dimensions. In this embodiment, two spatially distributed receivers $RX_1$ and $RX_2$ are coupled to or provided by the receiver platform 130. A center 910 of the spatially-distributed receiver antennas $RX_1$ and $RX_2$ is located equidistant between $RX_1$ and $RX_2$ when the distance $b_1$ between center 910 and $RX_1$ is equal to the distance $b_2$ between center 910 and the $RX_2$. Stated another way, the center 910 is the overall phase center of a spatially-distributed architecture of N antenna arrays comprising $RX_1$ and $RX_2$. The manner in which the position of the target 120 can be calculated using the path length differences resulting from the use of both distributed SDA antennas that define origin 10 and distributed receivers that define a phase center 910 will now be described with reference to FIG. 9. In this example, it is assumed that the values of the vectors $a_1$, $a_2$, $b_1$, $b_2$, $RTC_{toRXc}$ and angles $\theta_{RX}$ and $\varnothing_{RX}$ are all known, while the values of the vectors $RTC_{toTARGET}$, $RANT_{1toTARGET}$, $RANT_{2toTARGET}$, and $RRX_{1toTARGET}$ and the angles $\theta_{TARGET}$ and $\varnothing_{TARGET}$ are unknown. However, because the signals that reflect off of the object share a common path along $R_{RXANT1toTARGET}$ and a separate common path along $R_{RXANT2toTARGET}$, the difference in arrival times at the respective receiver platform antennas is entirely due to the difference in the lengths of the vectors $RANT_{1toTARGET}$ and $RANT_{2toTARGET}$. This information is enough to allow the angle of the object, $\theta_{TARGET}$ relative to the origin 10 to be calculated in the coordinate frame 5 defined by the location of the antennas 228a-228n in the SDA of antenna arrays 112. In two dimensions assuming $|a_1|=|a_2|$, the differential range measurements and the angle of the object relative to the origin 10 are related by the equation:

$$|RANT_{1toTARGET}| - |RANT_{2toTARGET}| = (|a_1 - a_2|)\sin\theta_{TARGET}.$$

In two dimensions assuming $b_1=b_2$, the differential range measurements and the angle of the target relative to the center 910 of the receiver antennas $RX_1$ and $RX_2$ are related by the equation:

$$|RXANT_{1toTARGET}| - |RXANT_{2toTARGET}| = (|b_1 - b_2|)\sin\varphi_{TARGET}.$$

The length or range of the vector $RXANT_{1toTARGET}$ can be determined by the difference of the total range of the reflected versions of the uniquely coded signals received at $RX_1$ and the lengths of the vectors $RANT_{1toTARGET}$ and $RANT_{2toTARGET}$. Similarly, the length or range of the vector $RXANT_{2toTARGET}$ can be determined by the difference of the total range of the reflected versions of the uniquely coded signals received at $RX_2$ and the lengths of the vectors $RANT_{1toTARGET}$ and $RANT_{2toTARGET}$. This two-dimensional system can be extended to three dimensions.

Figure 10:
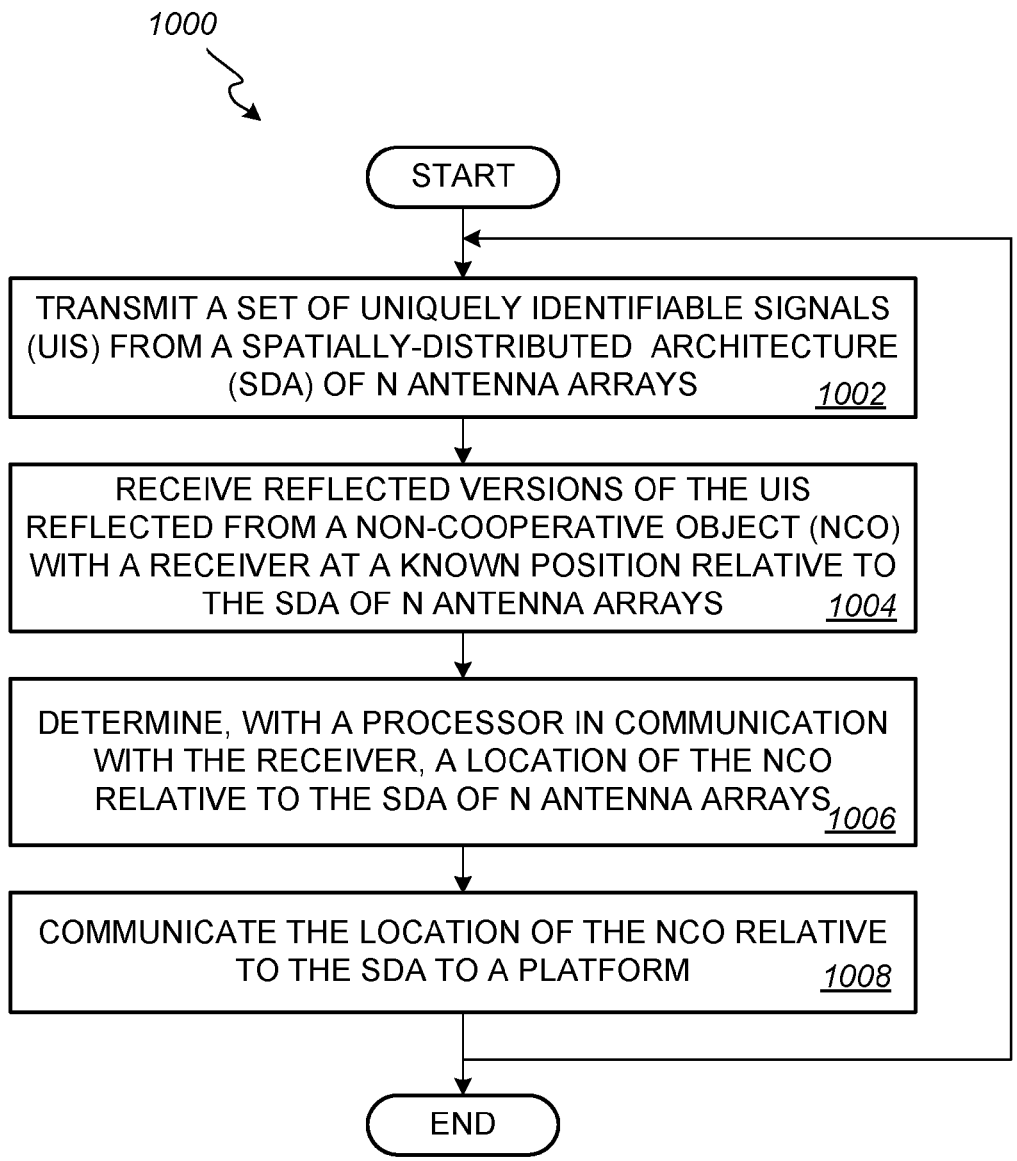
FIG. 10 is a flow diagram illustrating an example embodiment of a method for locating a non-cooperative object relative to a platform.

FIG. 10 illustrates an example embodiment of a method 1000 that can be performed by SDA 110 to determine a position of a non-cooperative object 120 relative to the SDA 110 and to communicate the position to a platform 150 remote from the SDA 110. The method 1000 begins with block 1002 where the SDA 110 transmits a set of uniquely identifiable signals from respective spatially-distributed antenna arrays 112. In block 1004, a receiver or receiver subsystem 130 located at a known position relative to the antenna arrays 112, receives reflected versions 114 of the uniquely identifiable signals 113 reflected from the non-cooperative object 120. In block 1006, a processor 131 in communication with the receiver or receiver subsystem 130 determines a location of the non-cooperative object 120 relative to a coordinate system 5 defined by the antenna arrays 112. Thereafter, as indicated in block 1008, the SDA 110 communicates the location of the non-cooperative object 120 in the coordinate system 5 to one or more platforms 150.

Figure 11:
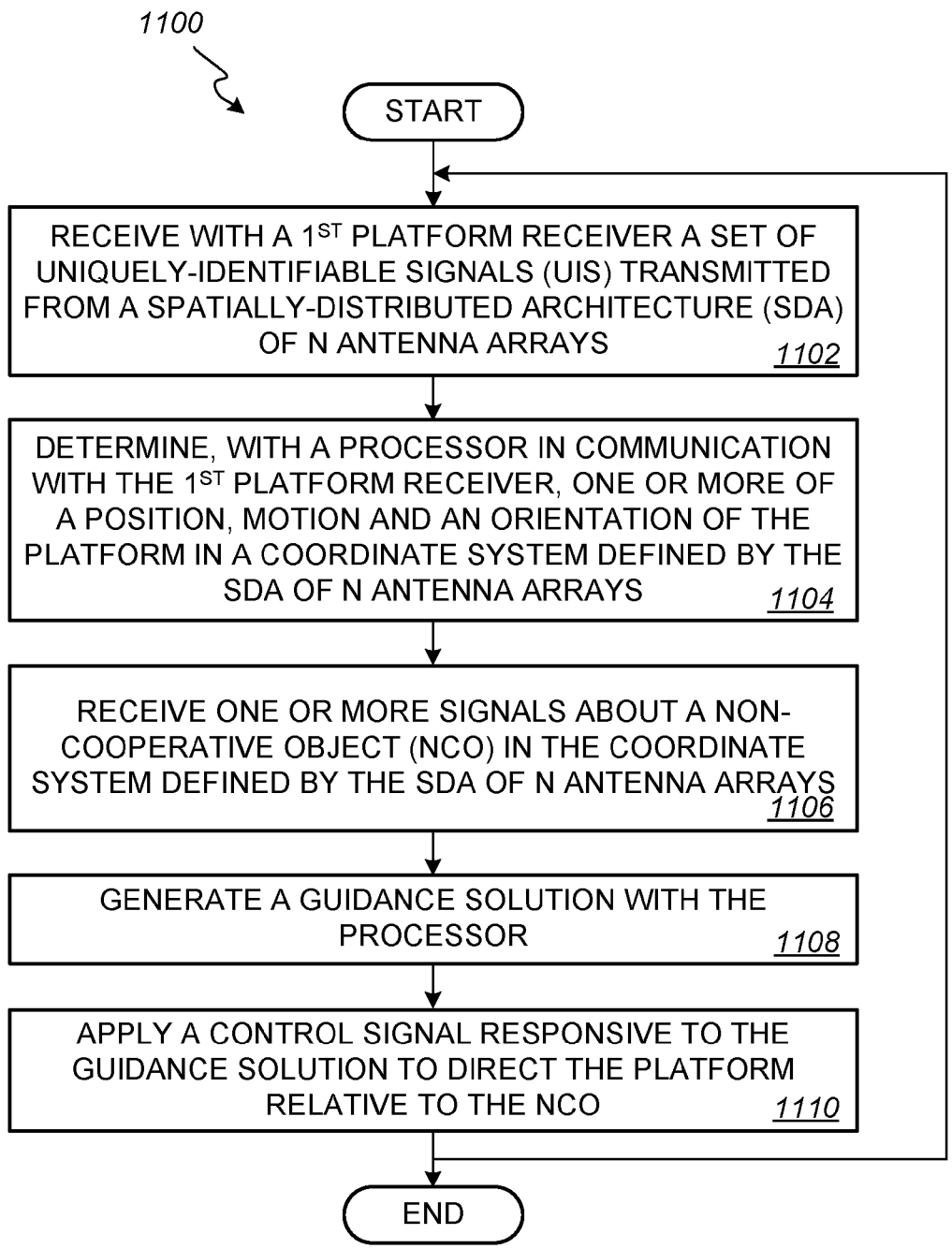
FIG. 11 is a flow diagram illustrating an example embodiment of a method for self-determining one or more of a position, motion and orientation in a coordinate system and guiding a platform relative to a remote non-cooperative object.

FIG. 11 illustrates an example embodiment of a method 1100 that can be performed by a platform 150. The method 1100 enables the platform 150 to self-determine a platform position in a coordinate system 5 defined by a spatially-distributed architecture of antenna arrays 112 and to use information received from the spatially-distributed architecture of antenna arrays 112 regarding the location of a non-cooperative object 120. The platform 150 uses the location of the non-cooperative object 120 to guide the platform 150 relative to the non-cooperative object 120. The method begins with block 1100 where a first platform receiver located on the platform 150 receives a set of uniquely identifiable signals from respective spatially-distributed antenna arrays 112. In block 1104, a processor 151 in communication with the first platform receiver, determines one or more of position, motion and orientation of the platform in the coordinate system 5 based on characteristics of the uniquely identifiable signals 113 transmitted from the spatially-distributed architecture of antenna arrays 112. In block 1106, the platform 150 receives one or more information signals 115 that contain information about the location of the non-cooperative object 120 in the coordinate system 5. In block 1108, the processor 151 generates a guidance solution based on the position, motion and orientation of the platform relative to the position and motion (if any) of the non-cooperative object 120 in the coordinate system 5. In block 1110, a control signal responsive to the guidance solution is forwarded to a control system on the platform 150 to direct the platform 150 relative to the non-cooperative object 120.

The illustrated embodiments provide a system where a platform(s) 150 no longer has to rely on inertial guidance systems to direct the platform 150 on a trajectory or path toward the non-cooperative object or target 120. Since the receiver subsystem 130 tracks the location of the target 120 and the platform 150 self-locates its position in a common coordinate system 5, a processor (e.g., the processor 151) need not perform a coordinate translation before determining a guidance solution from these inputs.

In addition, since tracking of the target 120 by the receiver subsystem 130 and the platform 150 self-tracking are performed in a common reference frame 5 defined by the locations of the antennas 228a-228n in the SDA 110, a transition of the responsibility for tracking the target or non-cooperative object 120 can be transferred to the platform 150 from the receiver subsystem 130 without a need for a coordinate translation. The hand off or transfer is efficient as a single filter can be used for both the N uniquely coded signals 113 and the reflected versions 114 of the N uniquely coded signals 113, thereby reducing the possibility of filter transients as a result of the transition. From the time of transition until interception, the platform 150 continues to self-track while also tracking the target 120. The same principles described above with reference to FIGS. 5-9 apply to the operations performed by the platform 150 to self-track while also tracking the non-cooperative object or target 120.

In addition, when a platform 150 is arranged with optional antennas 154 arranged to receive an indication of the location and motion (if any) of the target 120 the platform 150 continues to self-track its position and motion relative to the origin 10 of the coordinate system 5, while the additional antenna 154 receives the target tracking information from the external source 180 and delivers it to the guidance system (not shown) of the platform 150. For example, the position and motion of the target 120 as measured by the external source 180 may be in a coordinate system defined by or provided to an inertial sensor (not shown) of the external source 180. The platform 150 will receive the information in that alternative coordinate system from the external source 180 and transform it into the coordinate frame 5 defined by the locations of the transmitters 228a-228n in the SDA 110. The guidance system of the platform 150 then uses this transformed or converted information to adjust its flight path or direction, if necessary, such that it converges with the non-cooperative object 120 when so desired. Alternatively, the guidance system (not shown) of the platform 150 uses the information to adjust its path, if necessary, such that its path orbits or otherwise avoids the non-cooperative object 120 when so desired.

It should be noted that this disclosure has been presented with reference to one or more exemplary or described embodiments for the purpose of demonstrating principles and concepts. The claimed systems, methods and computer-readable media are not limited to these example embodiments. As will be understood by persons skilled in the art, in view of the description provided herein, many variations may be made to the example embodiments described herein and all such variations are within the scope of the invention.

REFERENCE SYMBOLS 5 coordinate system
10 origin
12 X-axis
13 Y-axis
14 Z-axis
100 environment
110 spatially-distributed architecture
110' spatially-distributed architecture
111 signal generator
112 N antenna arrays
113 N uniquely coded signals
114 reflections (of coded signals)
115 information signal
117 N uniquely coded signals (modified)
120 non-cooperative object (target)
122 cooperative object
130 first receiver subsystem
131 processor
132 antenna(s)
135 memory
138 signal generator
139 connection
140 signal
150 platform(s)

151 processor
152 antenna(s)
154 antenna (optional)
155 memory
180 alternate signal source
185 information signal
201 SDA subsystem
202 processor
203 input/output interface
204 clock generator
205 memory
206 bus
211 signal generator
212 Local info. store
213 TX module
214 RX module
215 code store/signal gen.
216 connection
217 connection
220 SDA circuitry
220' SDA circuitry
221 TX circuitry
221' TX circuitry
222 RX circuitry
223 master oscillator
224 synchronization clock
225 connection
226 TX signal generator
228 N antenna arrays
330 receiver platform
330' receiver platform
331 processor
331' processor
332 bus

REFERENCE SYMBOLS (CONTINUED)

333 input/output interface
334 clock generator
335 memory
336 location module
337 motion module
338 information signal logic
339 local info store
342 connection
350 demodulator
360 matched filter bank
400 platform
400' platform
402 phase-locked loop (PLL)
404 local oscillator
405 summing node
406 clock
410 RX/demodulator
411' processor
411' processor
412 bus
413 input/output interface
414 clock generator
415 memory
416 connection
417 connection
420 matched filter bank
431 location module
432 motion module
433 orientation module
434 second module (navigation/guidance)
435 signal generator
436 conversion module
437 coordination module
438 local info store
450 platform circuitry
460 receiver
465 antenna
910 RX array center
1000 SDA method
1002-1008 SDA method steps
1100 platform method
1102-1110 platform steps

What is claimed is:

1. A system for guidance or navigation, the system comprising:
a spatially-distributed architecture (SDA) of antenna arrays, the SDA having at least N members of antenna arrays spatially separated from each other, the N members transmitting uniquely coded signals, respectively, where N is an integer greater than or equal to two, a position and orientation of the antenna arrays of the SDA identifying a first coordinate system consisting of at least two orthogonal axes;
a first receiver having a known position in the first coordinate system, the first receiver receiving reflections of the uniquely coded signals reflected by a non-cooperative object;
a first processor in communication with the first receiver, the first processor in response to information from the first receiver, determining at least a position of the non-cooperative object in the first coordinate system based on the reflections of the uniquely coded signals;
a platform separated from the SDA of antenna arrays, the platform having a second receiver disposed thereon, the second receiver directly receiving the uniquely coded signals transmitted by the SDA; and
a platform processor in communication with the second receiver, the platform processor, in response to information from the second receiver, determining at least a position of the platform in the first coordinate system based on one or more characteristics of the uniquely coded signals received by the second receiver.

2. The system of claim 1, wherein the SDA communicates to the platform at least P electrical measurements made by the first receiver in response to the reflections of the N uniquely coded signals generated by the N transmit arrays, where P is a positive integer.

3. The system of claim 2, wherein the platform processor uses the P electrical measurements made by the first receiver to track one or more of the position, motion, and orientation of the non-cooperative object.

4. The system of claim 1, wherein the SDA communicates at least the position of the non-cooperative object in the first coordinate system to the platform.

5. The system of claim 4, wherein the platform processor uses at least the position of the non-cooperative object as determined by the first processor to track one or more of the position, motion, and orientation of the non-cooperative object.

6. The system of claim 1, wherein the first processor determines one or more of a position, motion and orientation of the non-cooperative object relative to the SDA based on reflections of at least two uniquely coded signals received by the first receiver and wherein at least one of the N members of antenna arrays communicates one or more of the position, motion and orientation of the non-cooperative object to the platform.

7. The system of claim 6, wherein the platform processor uses one or more of the position, motion and orientation of the non-cooperative object and one or more of the position, motion and orientation of the platform to generate a guidance solution to direct the platform relative to the non-cooperative object.

8. The system of claim 6, wherein the first processor receives information including one or more of the position, motion and orientation of the non-cooperative object relative to the SDA from an alternative signal source and uses the information from the alternative signal source together with the reflections of at least two uniquely coded signals to determine one or more of the position, motion and orientation of the non-cooperative object relative to the SDA.

9. The system of claim 1, further comprising:
 a third receiver disposed on the platform and in communication with the platform processor, the third receiver receiving reflections of the uniquely coded signals reflected by the non-cooperative object, the platform processor in response to information from the third receiver, determining at least a position of the non-cooperative object in the first coordinate system based on received reflections of the uniquely coded signals, wherein the platform processor uses information from the first and third receivers to track the non-cooperative object.

10. The system of claim 9, wherein the platform processor determines the position, motion and orientation of the non-cooperative object in the first coordinate system using the information from the first and third receivers.

11. The system of claim 9, wherein at least one of the second receiver and the third receiver further receive a modified version of the uniquely coded signals.

12. The system of claim 11, wherein the modified version of the uniquely coded signals identifies a cooperative object that can be used by the platform for navigation.

13. The system of claim 12, wherein the cooperative object includes a device that modifies the uniquely coded signals and retransmits modified versions of the uniquely coded signals to uniquely identify a particular cooperative object.

14. The system of claim 13, wherein a modification includes a change in frequency, time, phase or polarization identifies the cooperative object.

15. The system of claim 9, wherein the platform processor uses information from both the second and the third receiver to determine at least one of a platform orientation, a platform velocity and a platform orientation in the first coordinate system.

16. The system of claim 9, wherein the platform processor uses information from the second receiver and information from the third receiver to determine orientation of the platform in the first coordinate system.

17. The system of claim 9, wherein the platform processor uses information from the second receiver to determine roll angle of the platform in the first coordinate system.

18. The system of claim 1, further comprising:
 M additional platforms arranged with respective second and third receivers, where M is an integer greater than or equal to 2, the respective third receivers receiving respective reflections of the uniquely coded signals reflected by the non-cooperative object.

19. The system of claim 18, wherein at least a first member of a group of platforms includes a respective platform processor that determines a first member distance to the non-cooperative object and receives information from at least two other members from the group of platforms, the information including a respective present position and a respective distance to the non-cooperative object in the first coordinate system defined by the SDA.

20. The system of claim 19, wherein the respective platform processor of the first member of the group of platforms determines a present position of the non-cooperative object in the first coordinate system.

21. The system of claim 20, wherein the first member of the group of platforms communicates the present position of the non-cooperative object to other members of the group of platforms.

22. The system of claim 20, wherein the respective platform processor of the first member of the group of platforms uses one or more of the position, motion and orientation of the first member of the group of platforms and the present position of the non-cooperative object to generate a guidance solution to direct the first member of the group of platforms relative to the non-cooperative object.

23. The system of claim 1, further comprising:
 a third receiver disposed on the platform and in communication with the platform processor, the third receiver receiving a signal from a source other than the uniquely coded signals that are reflected from the non-cooperative object, the platform processor in response to information from the third receiver, determining at least a position of the non-cooperative object in a second coordinate system.

24. The system of claim 23, wherein determining at least the position of the non-cooperative object comprises a conversion from the second coordinate system to the first coordinate system when the second coordinate system is different from the first coordinate system.

25. The system of claim 23, wherein the platform processor uses at least the position of the non-cooperative object as received in the information signal and at least the position of the platform in the first coordinate system based on the uniquely coded signals received by the second receiver to generate a guidance solution to direct the platform relative to the non-cooperative object.

26. The system of claim 23, wherein the non-cooperative object is not reflective with respect to the N uniquely coded signals.

27. The system of claim 1, wherein the non-cooperative object is selected from the group consisting of a missile, projectile, aircraft and spacecraft.

28. The system of claim 1, wherein the non-cooperative object is selected from the group consisting of a buoy, flotsam, jetsam, and a ship.

29. The system of claim 1, wherein the non-cooperative object is supported by land.

30. The system of claim 1, wherein the platform processor receives information responsive to an environment.

31. The system of claim 30, wherein the information responsive to the environment is selected from the group consisting of a floorplan of a structure, a map of an airport, a city map, and a harbor chart.

32. A method for locating at least one non-cooperative object and communicating a location of the at least non-cooperative object in a first coordinate system determined by a spatially-distributed architecture (SDA) of antenna arrays, the method comprising:
 transmitting, with a SDA of N antenna arrays, a set of uniquely identifiable signals, where N is an integer greater than or equal to two;
 receiving, with a receiver having a known position relative to the SDA of N antenna arrays, reflected versions of the uniquely identifiable signals transmitted from the SDA of N antenna arrays and reflected from the non-cooperative object;

determining, with a processor in communication with the receiver, a location of the non-cooperative object with respect to the SDA of N antenna arrays, the determining based on one or more characteristics of the reflected versions of the uniquely identified signals; and communicating, from the processor in communication with the receiver, the location of the of the non-cooperative object to a platform.

33. The method of claim 32, wherein the platform is selected from the group consisting of a portable device, a vehicle, a ship, and a taxiing aircraft.

34. The method of claim 32, wherein the platform is selected from the group consisting of a missile, a projectile, an aircraft and a spacecraft.

35. A method for self-determining one or more of position and orientation in a coordinate system and controlling a platform, the method comprising:

receiving, with a first receiver connected to a platform, a set of uniquely identifiable signals transmitted from a spatially-distributed architecture (SDA) of N antenna arrays removed from the platform;

determining, with a platform processor in communication with the first receiver, one or more of a position, a motion and an orientation of the platform in a first coordinate system defined by the SDA of N antenna arrays, wherein the platform processor identifies at least one of the position, the motion and the orientation of the platform using one or more characteristics of the uniquely identified signals received by the first receiver;

receiving one or more signals containing information about a non-cooperative object in the first coordinate system defined by the SDA of N antenna arrays;

generating, with the platform processor, a guidance solution; and applying at least one control signal responsive to the guidance solution to direct the platform relative to the non-cooperative object.

36. The method of claim 35, wherein the platform is selected from the group consisting of a portable device, vehicle, ship, plane, missile, projectile and spacecraft.

37. The method of claim 35, wherein the non-cooperative object is selected from the group consisting of a structure, vehicle, buoy, flotsam, jetsam, ship, missile, projectile, aircraft and spacecraft.

38. The method of claim 35, further comprising:
receiving a modified version of the uniquely coded signals.

39. The method of claim 38, wherein the modified version of the uniquely coded signals identifies a cooperative object.

40. The method of claim 38, wherein the modified version of the uniquely coded signals includes a change in frequency.

41. The method of claim 40, wherein the change in frequency is greater than an expected change in frequency due solely to relative motion of the platform and a cooperative object responsible for the change in frequency.

42. The method of claim 35, wherein the platform processor receives an information signal from an alternative signal source, the information signal containing one or more of a position, a motion and an orientation of the non-cooperative object in a second coordinate system different from the first coordinate system; and converting, with the platform processor, one or more of the position, motion and orientation of the platform in the first coordinate system to the second coordinate system before generating the guidance solution; or converting, with the platform processor, one or more of the position, motion and orientation of the non-cooperative object in the second coordinate system to the first coordinate system before generating the guidance solution.

43. The method of claim 35, further comprising:
providing two or more additional platforms arranged with respective first and second platform receivers, wherein at least one platform processor determines a first distance to the non-cooperative object from the at least one platform in the first coordinate system defined by the SDA; and receives information from at least two other platforms, the information including a respective platform position and a respective distance to the non-cooperative object in the first coordinate system defined by the SDA.

44. The method of claim 43, wherein the at least one platform communicates the present position of the non-cooperative object in the first coordinate system to other platforms.

45. A non-transitory computer-readable medium having executable code stored thereon for execution by a processor, the computer-readable medium comprising:

a transmit module arranged to communicate a set of uniquely identifiable signals to a spatially distributed architecture (SDA) of N antenna arrays, where N is a positive integer greater than or equal to two, the SDA defining a first coordinate system;

a receive module coupled to a first receiver located at a known position in the first coordinate system where the first receiver,
receives reflected versions of the set of uniquely identifiable signals transmitted from the SDA of N antenna arrays and reflected by the non-cooperative object,
determines a location of the non-cooperative object in the first coordinate system based on a respective time of arrival and phase of reflected versions of the uniquely identified signals and an angular position and a range of the first receiver relative to an origin of the first coordinate system, and
forwards an information signal containing the location of the non-cooperative object in the first coordinate system.

46. The non-transitory computer-readable medium of claim 45, wherein the non-cooperative object is selected from the group consisting of a structure, vehicle, buoy, flotsam, jetsam, ship, missile, projectile, aircraft, and spacecraft.

47. A non-transitory computer-readable medium having executable code stored thereon for execution by a processor, the computer-readable medium comprising:

a locator module integrated in a movable platform and arranged to receive a first set of signals responsive to non-reflected versions of a set of uniquely identifiable signals transmitted from a spatially distributed architecture (SDA) of N antenna arrays, where the locator module determines one or more of a platform position, motion and orientation from spatial relationships of the N antenna arrays and a respective time of arrival and phase of the set of uniquely identifiable signals in a first coordinate system defined by the SDA of N antenna arrays; and a second module arranged to receive one or more of the position, motion and orientation of the platform from the locator module and a position and motion of the non-cooperative object from a signal source remote from the movable platform, wherein the position and motion of the non-cooperative object are communicated in the coordinate system defined by the SDA of N antenna arrays and where the second module generates one or more control signals to direct the platform with respect to the non-cooperative object.

48. The non-transitory computer-readable medium of claim 47, wherein the platform is selected from the group consisting of a vehicle, ship, plane, missile, projectile, and spacecraft.

49. The non-transitory computer-readable medium of claim 47, wherein the non-cooperative object is selected from the group consisting of a structure, vehicle, buoy, flotsam, jetsam, ship, missile, projectile and aircraft.

50. The non-transitory computer-readable medium of claim 47, wherein the second module is arranged to receive a position and motion of a cooperative object from a second signal source remote from the movable platform, wherein the position and motion of the cooperative object are communicated in the coordinate system defined by the SDA of N antenna arrays and where the second module generates one or more control signals to direct the platform with respect to the non-cooperative object and the cooperative object.

51. The non-transitory computer-readable medium of claim 47, further comprising:

a conversion module that is controllably enabled when the second module receives information from a signal from an alternative signal source, the information containing one or more of a position, motion and an orientation of the non-cooperative object in a second coordinate system different from the first coordinate system, the conversion module arranged to:

convert one or more of the position, motion and orientation of the moveable platform in the first coordinate system to the second coordinate system before the second module generates the one or more control signals; or convert one or more of the position, motion and orientation of the non-cooperative object in the second coordinate system to the first coordinate system before the second module generates the one or more control signals.

52. The non-transitory computer-readable medium of claim 47, further comprising:

a coordinator module that receives information from at least two other movable platforms, the information including a respective platform position and a respective distance to the non-cooperative object, where the coordinator module determines a present position of the non-cooperative object in the first coordinate system and communicates the present position of the non-cooperative object to other platforms.

* * * * *